United States Patent
Adan et al.

(10) Patent No.: US 6,303,924 B1
(45) Date of Patent: *Oct. 16, 2001

(54) IMAGE SENSING OPERATOR INPUT DEVICE

(75) Inventors: Manolito E. Adan, Woodinville; Terry M. Lipscomb, Bellevue, both of WA (US)

(73) Assignee: Microsoft Corporation, Redmond, WA (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/217,403

(22) Filed: Dec. 21, 1998

(51) Int. Cl.[7] .................................................. G04G 5/08

(52) U.S. Cl. ..................... 250/221; 250/206.1; 345/166

(58) Field of Search ................................ 250/221, 222.1, 250/208.1, 206.1; 345/156, 157, 162, 163, 166

(56) References Cited

U.S. PATENT DOCUMENTS

| D. 281,776 | 12/1985 | Giffin | D13/32 |
|---|---|---|---|
| D. 302,010 | 7/1989 | McLaughlin et al. | D14/100 |
| D. 315,896 | 4/1991 | Brawn | D14/100 |
| 4,364,035 | 12/1982 | Kirsch | 340/710 |
| 4,390,873 * | 6/1983 | Kirsch | 250/237 R |
| 4,578,674 | 3/1986 | Baker et al. | 340/710 |
| 4,647,771 | 3/1987 | Kato | 250/237 R |
| 4,682,159 | 7/1987 | Davison | 340/709 |
| 4,712,101 | 12/1987 | Culver | 340/710 |

(List continued on next page.)

FOREIGN PATENT DOCUMENTS

| 295 15 871 U1 | 11/1995 | (DE). |
|---|---|---|
| 0 572 009 A1 | 12/1993 | (EP). |
| 2 272 763 | 5/1994 | (GB). |
| 2 312 040 A | 10/1997 | (GB). |
| WO 94/10652 | 5/1994 | (WO). |
| WO 97/06506 | 2/1997 | (WO). |
| WO/00 US/38103 | 6/2000 | (WO). |

OTHER PUBLICATIONS

IBM Technical Disclosure Bulletin 31 (1989) Jan., No. 8, Armonk, NY, US "Variable Grid Pattern Pads for Optical Mouse Contact Surface".

IBM Technicle Disclosure Bulletin, vol. 32, No. 3B, Aug. 1989, Armonk, NY, US "Programmable Liquid Crystal Display Mouse Pads".

"Lyon's eye", brochure, 1998.

"Genius Optical Mouse", brochure, 1998.

"Three–Button Mouse", brochure, Media Depot Inc., copyright 1995–96.

"OPT–MOUSE", brochure, Copyright 1998, Silicon Graphics, Inc.

"Your Gateway to the Next Millennium", Tronix Corp., 3 page copy of web page dated Apr. 8, 1998.

"Q–500 Optical Mouse", 4 page copy of web site date Apr. 9, 1998.

Primary Examiner—John R. Lee
Assistant Examiner—Kevin Pyo
(74) Attorney, Agent, or Firm—Joseph R. Kelly; Westman, Champlin & Kelly, P.A.

(57) ABSTRACT

A computer input device detects images on a surface. The computer input device generates input information indicative of a change event when the device switches from reading one predetermined pattern to reading another predetermined pattern. The present invention can also be directed to a method of using the input device or printable medium with the predetermined patterns disposed thereon.

36 Claims, 18 Drawing Sheets

U.S. PATENT DOCUMENTS

| | | | |
|---|---|---|---|
| 4,736,191 | 4/1988 | Matzke et al. | 340/365 |
| 4,751,505 | 6/1988 | Williams et al. | 340/710 |
| 4,797,544 | 1/1989 | Montgomery et al. | 250/221 |
| 4,799,055 | 1/1989 | Nestler et al. | 340/710 |
| 4,804,949 | 2/1989 | Faulkerson | 340/710 |
| 4,856,785 | 8/1989 | Lantz et al. | 273/148 B |
| 4,857,903 | 8/1989 | Zalenski | 340/710 |
| 4,906,843 | 3/1990 | Jones et al. | 250/221 |
| 4,922,236 | 5/1990 | Heady | 340/710 |
| 4,961,138 | 10/1990 | Gorniak | 364/200 |
| 5,274,361 | 12/1993 | Snow | 345/166 |
| 5,296,838 | 3/1994 | Suzuki | 345/157 |
| 5,298,919 | 3/1994 | Chang | 345/221 |
| 5,347,275 | 9/1994 | Lau | 341/20 |
| 5,349,371 | 9/1994 | Fong | 345/166 |
| 5,367,315 | 11/1994 | Pan | 345/156 |
| 5,440,144 | 8/1995 | Raffel et al. | 250/574 |
| 5,463,387 | 10/1995 | Kato | 341/31 |
| 5,471,542 | 11/1995 | Ragland | 382/128 |
| 5,517,211 | 5/1996 | Kwang-Chien | 345/166 |
| 5,525,764 | 6/1996 | Junkins et al. | 178/18 |
| 5,532,476 | 7/1996 | Maikan | 250/221 |
| 5,557,440 | 9/1996 | Hanson et al. | 359/161 |
| 5,558,329 | 9/1996 | Liu | 273/148 B |
| 5,574,480 | 11/1996 | Pranger et al. | 345/166 |
| 5,577,848 | 11/1996 | Bowen | 400/472 |
| 5,578,817 | 11/1996 | Bidiville et al. | 250/221 |
| 5,617,312 | 4/1997 | Iura et al. | 364/188 |
| 5,627,565 | 5/1997 | Morishita et al. | 345/158 |
| 5,644,337 | 7/1997 | Stacy | 345/167 |
| 5,680,157 | 10/1997 | Bidiville et al. | 345/165 |
| 5,686,942 | 11/1997 | Ball | 345/158 |
| 5,694,153 | 12/1997 | Aoyagi et al. | 345/161 |
| 5,729,009 | 3/1998 | Dandliker et al. | 250/208.2 |
| 5,729,251 | 3/1998 | Nakashima | 385/200.2 |
| 5,848,231 | 12/1998 | Teitelbaum et al. | 395/186 |

\* cited by examiner

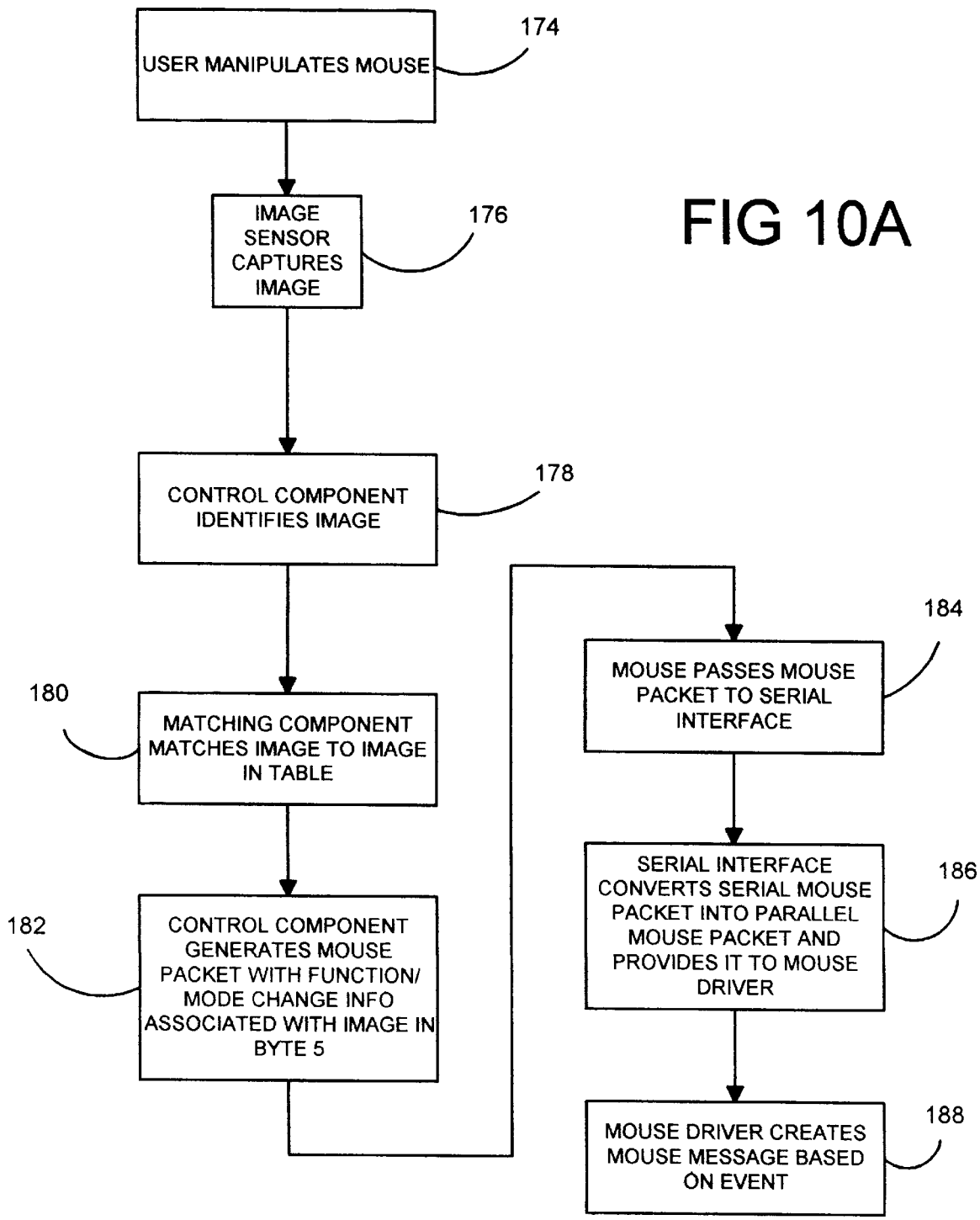

IMAGE SENSING OPERATOR INPUT DEVICE

REFERENCE TO CO-PENDING APPLICATION

Reference is made to co-pending U.S. patent application Ser. No. 09/036,809, filed Mar. 9, 1998, entitled "OPERATOR INPUT DEVICE", now U.S. Pat. No. 6,172,354 and assigned to the same assignee as the present application.

INCORPORATION BY REFERENCE

The following U.S. patent is hereby fully incorporated by reference:

U.S. Pat. No. 5,581,094 issued to Hara et al., entitled "PHOTODETECTOR ARRAY COMPRISING PHOTO DETECTORS, AND OBJECT DETECTOR COMPRISING THE PHOTO DETECTOR ARRAY AND AN OBJECT DETECTING PROCEDURE", and assigned to Mitsubishi Electric Corporation.

BACKGROUND OF THE INVENTION

The present invention relates to an input device for a computer system. More specifically, the present invention relates to an input device for providing position information to the computer system based on movement of the input device.

A traditional computer input device, such as a mouse, includes a housing, with a ball mounted in the housing. The ball is either configured in a traditional manner in which, in the normal work position, the ball engages a work surface and rotates based on the user's movement of the mouse across the work surface. The ball may also be provided as a track ball, which is rotated by digital manipulation from the user. In either case, position encoders are used to detect rotation of the ball in the mouse, and to provide position information indicative of that rotation to the computer. In many instances, the position information is used to control movement of a visual image (such as a mouse cursor) on the display screen of the computer.

Also, in one prior device, a mouse is configured with the track ball arrangement described above. The track ball is preprinted with a uniform predetermined image. A charge coupled device is used to detect the image on the track ball and detect movement of the image. Movement of the predefined image is used to provide position information to the computer.

However, the prior computer mouse which uses the charge coupled device configuration has a number of significant disadvantages. First, the reaction time of charge coupled devices is quite slow. In addition, processing an image signal from a charge coupled device is computationally intensive and takes a relatively large, and expensive processor. Also, charge coupled devices are highly sensitive to saturation. In other words, if the ambient light conditions are variable, charge coupled devices do not perform well. In addition, if an extraneous light source, such as a relatively bright light, is directed toward the image producing surface, the charge coupled devices can easily become saturated and their performance then quickly degrades.

Further, another prior computer mouse commercially available from Mouse Systems of CA included a mouse with an LED which was used in conjunction with a mouse pad having a predetermined, uniform pattern thereon. The pattern was formed by a uniform grid of blue and red lines. The emissions from the LED was reflected off of the mouse pad to a detector which provided an analog output signal. The signal was in the form of a waveshape with peaks corresponding to the different colored grid lines. From this waveform, the lines were counted and interpolated to obtain position information. Such a mouse system requires a mouse pad with a special uniform pattern implemented thereon.

In addition, typical mouse pointing devices are operated using a fixed scale and resolution. A fixed scale means that the mouse must always be moved a given distance over a work surface in order to move the cursor image on the computer screen a given number of pixels. For example, in order to move the cursor by 200 pixels on a computer screen having a resolution of 200 dots per inch (dpi), the mouse must be moved a fixed distance over the work surface, such as two inches. Each time the mouse is moved two inches, no matter what surface it is moved over, that movement will always correspond to movement of the cursor image by 200 pixels.

Fixed resolution refers to the resolution of the computer screen for which the smallest detectable discrete movement of the mouse will change the cursor position on the computer screen by only a single pixel. For example, some conventional mice have a resolution generally in the range of 200–400 dpi. This means that the smallest discrete movement of the mouse which is detectable by the position encoding mechanism in the mouse will change the cursor position on the display screen by only a single pixel for screens having a resolution in the range of 200–400 dpi. However, if the computer screen has a higher resolution, such as 1200 dpi, the smallest detectable discrete movement of the mouse may cause the cursor image to move 4–6 pixels on the display screen. Some current mice, with highly accurate position encoding mechanisms, can achieve a resolution of 1200 dpi.

As stated above, the scale and resolution of conventional mouse pointing devices are fixed. In order to change the scale or resolution, the user is typically required to load a different mouse driver which modifies the behavior of the mouse to change the resolution or to change the scale. Alternatively, a user can also use a separate control panel applet to trigger the software device driver to change the scale and resolution. Using a control applet to change scale or resolution can be quite cumbersome.

In some applications, items to be selected on the screen are quite small. Therefore, it can be difficult to select items when a high resolution monitor is used. In some instances, a single pixel offset can change the selection from one targeted item (or option) to another. One method which can be used to overcome this difficulty in such applications is to maintain the resolution and magnification of the computer screen at its nominal level and to decrease the resolution of the pointing device. However, as indicated above, conventional methods for changing the resolution of the pointing device can be quite cumbersome, particularly when a user desires to change the resolution a number of times while operating within a single application.

SUMMARY OF THE INVENTION

A computer input device detects images on a surface. The computer input device generates input information indicative of a change event when the device switches from reading one predetermined pattern to reading another predetermined pattern. The present invention can also be directed to a method of using the input device or printable medium with the predetermined patterns disposed thereon.

BRIEF DESCRIPTION OF THE DRAWINGS

FIGS. 10A and 10B represent a flow diagram illustrating operation of an input device in accordance with one embodiment of the present invention using the data packet illustrated in FIG. 9.

DETAILED DESCRIPTION OF THE ILLUSTRATIVE EMBODIMENTS

The present invention provides a user input device for generating position information and providing that information to a computer system. The position information is generated based on detected movement of the user input device, or a portion thereof. The movement is detected by identifying a pattern or image on a surface movable relative to the user input device and monitoring relative movement of the pattern.

OVERVIEW

Figure 1:
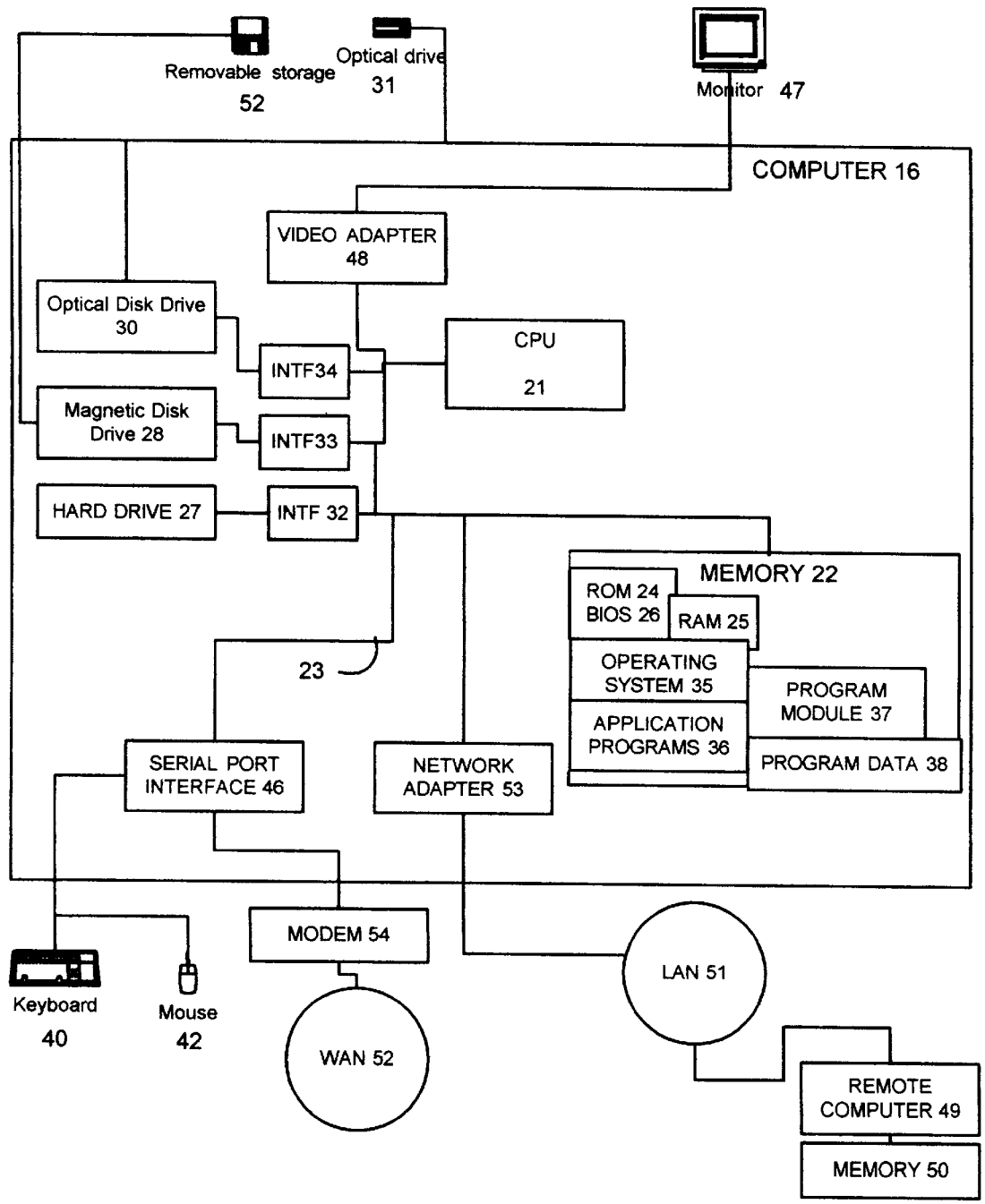
FIG. 1 is a block diagram of an exemplary environment for implementing an input device in accordance with the present invention.

FIG. 1 and the related discussion are intended to provide a brief, general description of a suitable computing environment in which the invention may be implemented. Although not required, the invention will be described, at least in part, in the general context of computer-executable instructions, such as program modules, being executed by a personal computer or other computing device. Generally, program modules include routine programs, objects, components, data structures, etc. that perform particular tasks or implement particular abstract data types. Moreover, those skilled in the art will appreciate that the invention may be practiced with other computer system configurations, including hand-held devices, multiprocessor systems, microprocessor-based or programmable consumer electronics, network PCs, minicomputers, mainframe computers, and the like. The invention is also applicable in distributed computing environments where tasks are performed by remote processing devices that are linked through a communications network. In a distributed computing environment, program modules may be located in both local and remote memory storage devices.

With reference to FIG. 1, an exemplary environment for the invention includes a general purpose computing device in the form of a conventional personal computer 20, including processing unit 21, a system memory 22, and a system bus 23 that couples various system components including the system memory to the processing unit 21. The system bus 23 may be any of several types of bus structures including a memory bus or memory controller, a peripheral bus, and a local bus using any of a variety of bus architectures. The system memory includes read only memory (ROM) 24 a random access memory (RAM) 25. A basic input/output 26 (BIOS), containing the basic routine that helps to transfer information between elements within the personal computer 20, such as during start-up, is stored in ROM 24. The personal computer 20 further includes a hard disk drive 27 for reading from and writing to a hard disk (not shown), a magnetic disk drive 28 for reading from or writing to removable magnetic disk 29, and an optical disk drive 30 for reading from or writing to a removable optical disk 31 such as a CD ROM or other optical media. The hard disk drive 27, magnetic disk drive 28, and optical disk drive 30 are connected to the system bus 23 by a hard disk drive interface 32, magnetic disk drive interface 33, and an optical drive interface 34, respectively. The drives and the associated computer-readable media provide nonvolatile storage of computer readable instructions, data structures, program modules and other data for the personal computer 20.

Although the exemplary environment described herein employs a hard disk, a removable magnetic disk 29 and a removable optical disk 31, it should be appreciated by those skilled in the art that other types of computer readable media which can store data that is accessible by a computer, such as magnetic cassettes, flash memory cards, digital video disks, Bernoulli cartridges, random access memories (RAMs), read only memory (ROM), and the like, may also be used in the exemplary operating environment.

A number of program modules may be stored on the hard disk, magnetic disk 29, optical disk 31, ROM 24 or RAM 25, including an operating system 35, one or more application programs 36, other program modules 37, and program data 38. A user may enter commands and information into the personal computer 20 through input devices such as a keyboard 42 and pointing device 40. Other input devices (not shown) may include a microphone, joystick, game pad, satellite dish, scanner, or the like. These and other input devices are often connected to the processing unit 21 through a serial port interface 46 that is coupled to the system bus 23, but may be connected by other interfaces, such as a sound card, a parallel port, a game port or a universal serial bus (USB). A monitor 47 or other type of display device is also connected to the system bus 23 via an interface, such as a video adapter 48. In addition to the monitor 47, personal computers may typically include other peripheral output devices such as speaker 45 and printers (not shown).

The personal computer 20 may operate in a networked environment using logic connections to one or more remote computers, such as a remote computer 49. The remote computer 49 may be another personal computer, a server, a router, a network PC, a peer device or other network node, and typically includes many or all of the elements described above relative to the personal computer 20, although only a memory storage device 50 has been illustrated in FIG. 1. The logic connections depicted in FIG. 1 include a local are network (LAN) 51 and a wide area network (WAN) 52. Such networking environments are commonplace in offices, enterprise-wide computer network intranets and the Internet.

When used in a LAN networking environment, the personal computer 20 is connected to the local area network 51 through a network interface or adapter 53. When used in a WAN networking environment, the personal computer 20 typically includes a modem 54 or other means for establishing communications over the wide area network 52, such as the Internet. The modem 54, which may be internal or external, is connected to the system bus 23 via the serial port interface 46. In a network environment, program modules depicted relative to the personal computer 20, or portions thereof, may be stored in the remote memory storage devices. It will be appreciated that the network connections shown are exemplary and other means of establishing a communications link between the computers may be used.

Figure 2A:
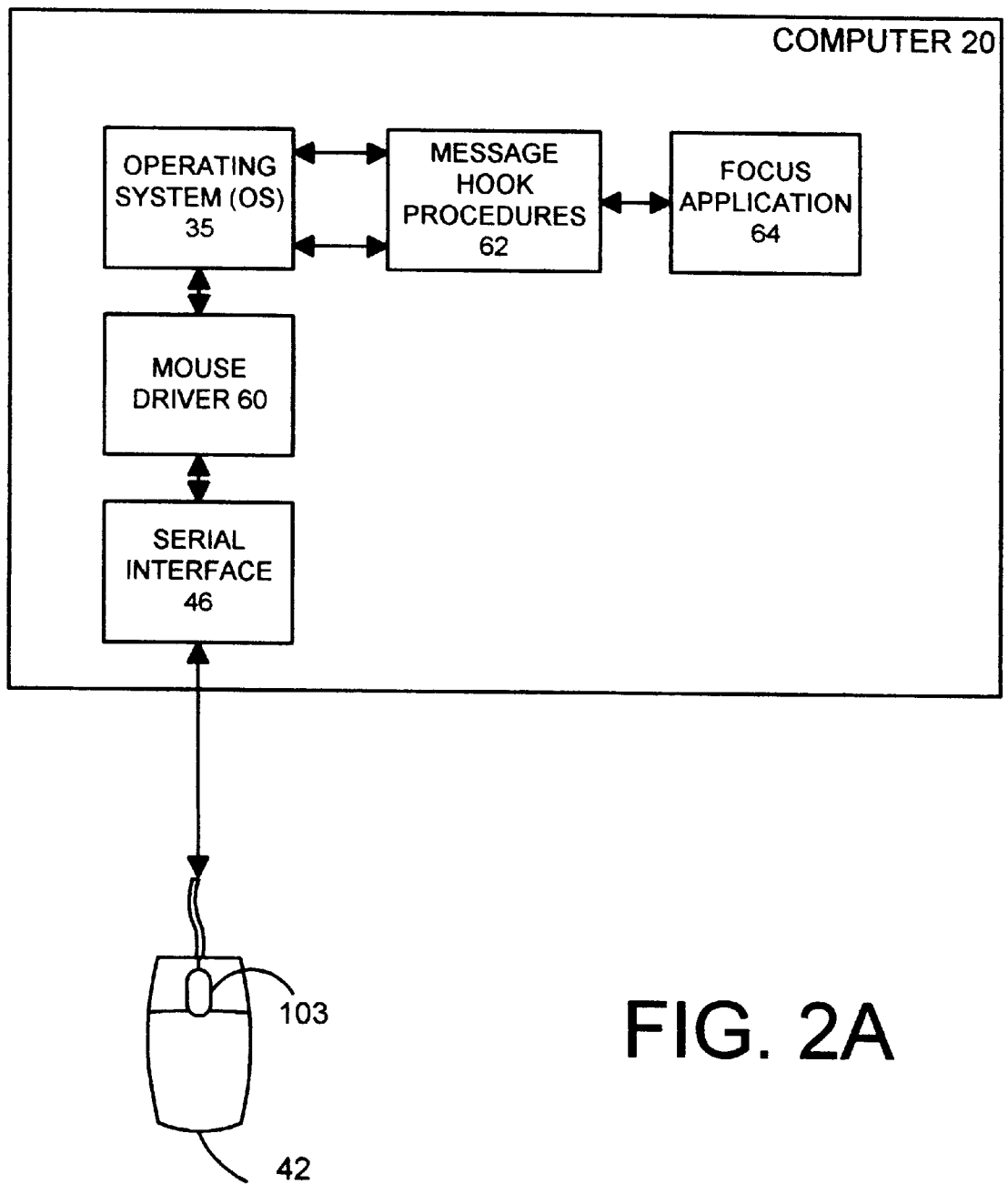
FIG. 2A is a functional block diagram of a computer and an input pointing device as used in one embodiment of the present invention.

For a better understanding of the present invention, a brief discussion of mouse message processing is now provided. FIG. 2A is a functional block diagram of computer 20 used with input device 42 in accordance with one embodiment of the present invention. Mouse 42 illustratively has right and left buttons and a depressible, rotatable wheel 103 there between. The block diagram of computer 20 shown in FIG. 2A includes a number of the items discussed with respect to FIG. 1, and those items are similarly numbered. However, the block diagram in FIG. 2A also shows a number of components in greater detail which are used in processing a mouse message. Computer 20 includes mouse driver 60, message hook procedure 62, and focus application 64. To better understand the operation of input device 42 in computer system 20 shown in FIG. 2A, the components of that system are discussed in connection with a data structure illustrated in FIG. 2B.

Figure 2B:
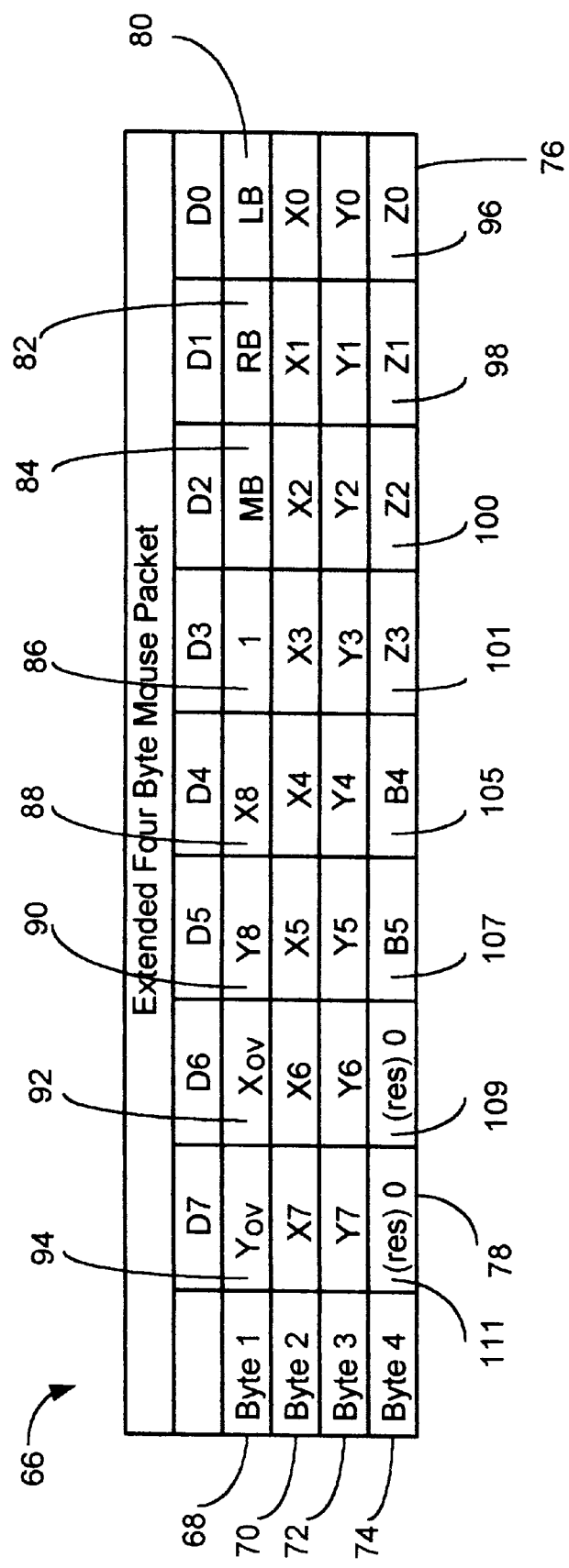
FIG. 2B illustrates a packet of information generated by an input pointing device for transmission to the computer.

FIG. 2B illustrates a four-byte mouse packet 66 in a row and column format with bytes 68, 70, 72, and 74 shown in rows and the individual bits of each byte shown in columns. Byte 68 is the first byte provided by input device 42, byte 70 is the second byte, byte 72 is the third byte, and byte 74 is the fourth byte. The columns of bits are organized with the least significant bits on the far right and the most significant bits on the far left. Thus, column 76 includes the least significant bits of each of the four bytes and column 78 includes the most significant bits of the four bytes.

Within mouse packet 66, first byte 68 includes left button bit 80, right button bit 82, and middle button bit 84. A one in the left button bit 80 indicates that the left button is depressed and a zero in left button bit 80 indicates the left button is not depressed. Similarly, a one in the right button bit 82 or middle button bit 84 indicates that the right button or the middle button, respectively, are depressed and a zero in either of these bits indicates that their respective button is not depressed.

Fourth bit 86 is set to a one.

Fifth bit 88 of byte 68 is the ninth bit of a 9-bit signed value that is completed by byte 70. The 9-bit value produced by the combination of bit 88 and byte 70 represents the direction and magnitude of movement of the mouse along the X-coordinate. Since the 9-bit value is in two's complement format, bit 88 indicates the direction of mouse movement such that if it has a value if zero, mouse movement is in a positive X direction and if it has a value of one, mouse movement is in the negative X direction.

Sixth bit 90 of first byte 68 is the ninth bit of a 9-bit signed value that is completed by byte 72. The combination of bit 90 and third byte 72 produces a value that indicates the magnitude and direction and movement of the mouse along the Y coordinate. Since this value is a two's complement signed value, bit 90 indicates the direction of movement along the Y coordinate such that if it has a value of one, the mouse movement is in a negative Y direction and if it has a value of zero, the mouse movement is in a positive Y direction.

Seventh bit 92 and eighth bit 94 of first byte 68 indicate whether the 9-bit values formed by bit 88 and byte 70 and by bit 90 and byte 72, respectively, have incurred an overflow condition. This occurs when more than nine bits of movement have been detected by the mouse. In this condition, the respective 9-bit value should be set to its maximum magnitude for the direction of movement.

The least significant four bits 96, 98, 100 and 101 of fourth byte 74 represent the direction and magnitude of movement of wheel 103 (illustrated in FIG. 2A). The value represented by bits 96–101 is a signed value wherein a positive value indicates wheel motion toward the user and a negative value indicates wheel motion away from the user.

Bits 105 and 107 are the fifth and sixth bits of byte 74, respectively, and indicate closure of switches corresponding to the left and right buttons, respectively, of mouse 42. Thus, when bit 105 has a value of one, the switch associated with the left button is closed indicating that the corresponding mouse button has been depressed. Bit 107 reflects closure of the switch associated with right mouse button in a similar fashion.

Bits 109 and 111 of fourth byte 74 are reserved for later use and are set to zero. Those skilled in the art will recognize that mouse packet 66 illustrated in FIG. 2B and the serial interface 46 described below are used in PS/2 and serial mouse connections. For universal serial bus (USB) connections, the mouse information is sent to the mouse driver using publicly available USB protocols for mice.

In order to describe the processing of a conventional mouse message, reference is made to both FIGS. 2A and 2B. To initiate a mouse message, the user first manipulates mouse 42. Based on this manipulation, mouse 42 generates a mouse packet that is passed to serial interface 46 and which is indicative of the manipulation event. When serial interface 46 receives mouse packet 66, it converts the serial information in mouse packet 66 into a set of parallel packets and provides the parallel packets to mouse driver 60. Mouse driver 60 creates a mouse message based on the manipulation event. The creation of the mouse message is identical to the manner in which existing mice create mouse messages.

The mouse message is then transmitted to operating system 35. In one illustrative embodiment, operating system 35 is a "WINDOWS NT®", a "WINDOWS 95", or a "WINDOWS 98®", brand operating system (provided by Microsoft Corporation of Redmond, Washington). Operating system 35 includes a mouse message hook list that identifies a series of mouse message hook procedures 62. When operating system 35 receives the mouse message from mouse driver 60, it examines the mouse message hook list to determine if any mouse message hook procedures have registered themselves with operating system 35. If at least one mouse message hook procedure has registered itself with operating system 35, operating system 35 passes the mouse message to the registered mouse message hook procedure 62 that appears first on the list.

The called mouse message hook executes and returns a value to operating system 35 that instructs the operating system to pass the mouse message to the next registered mouse message hook.

The mouse message may, for example, represent a command to an application which owns the window currently under focus in computer 20. In that instance, the message hook procedure 62 issues the command to the focus window application. In response, the focus window application 64 performs the desired function.

After the message hook procedure 62 issues the command to the focus application 64, the message hook procedure 62 consumes the mouse message by removing the message from the message chain. This is accomplished by returning a value to operating system 35 which indicates to the operating system that it should not pass the mouse message to any other message hook procedures.

Figure 3:
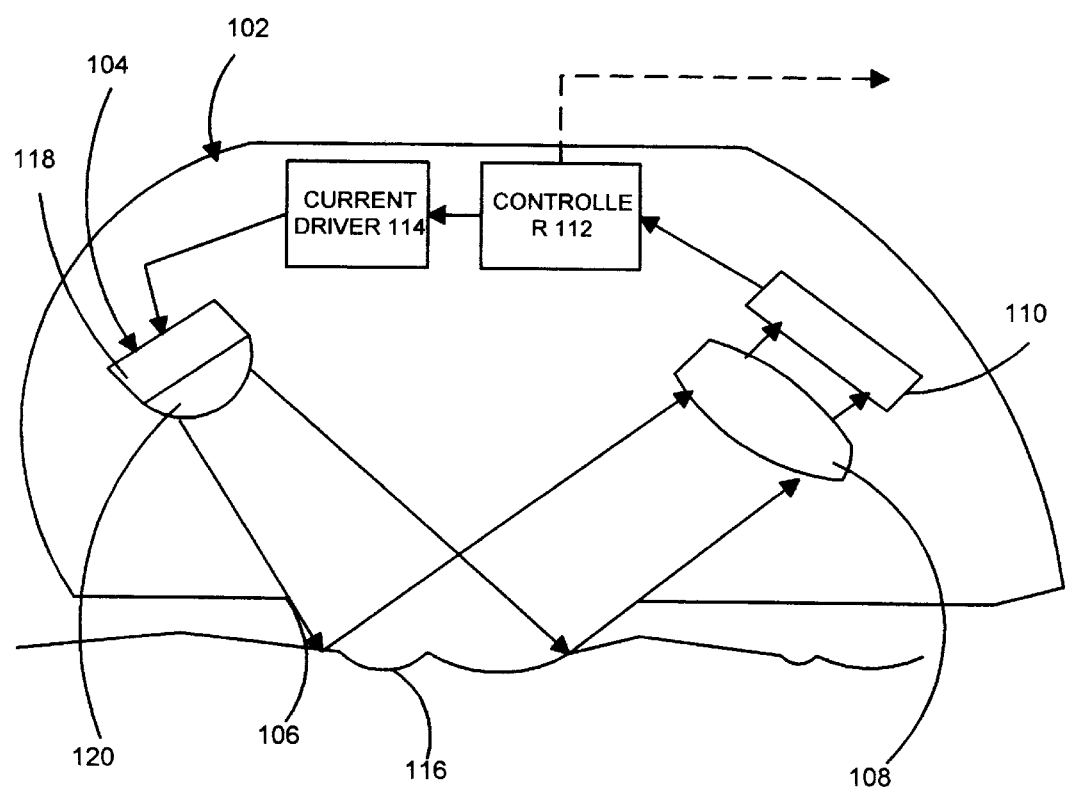
FIG. 3 illustrates a computer input device, shown in partial sectional and partial block diagram form, in accordance with one embodiment of the present invention.

FIG. 3 is a more detailed diagram, in partial block form and partial schematic form, illustrating an operator input device, such as mouse 42, in accordance with one embodiment of the present invention. Mouse 42 includes housing 102, electromagnetic radiation source (which may simply be a light source such as an LED) 104, aperture 106 defined in the bottom of housing 102, lens 108, image or pattern detector 110, controller 112, and current driver 114. In FIG. 3, mouse 42 is shown supported relative to work surface 116. Pattern detector 110 can be any suitable detector which is capable of detecting images or patterns from information carried by electromagnetic radiation impinging thereon and providing a signal indicative thereof, and may be an artificial retina pattern detector as described in greater detail below, for example.

Light source 104 can be any suitable source of electromagnetic radiation which can be used to provide radiation for impingement on a pattern or image and which can then be detected by pattern detector 110. In one illustrative embodiment, light source 104 includes LED 118 and lens 120. Radiation emitted from an LED 118 is transmitted through lens 120 such that it passes through aperture 106 in housing 102 and impinges upon work surface 116 which can have a predetermined pattern or image thereon. The light then reflects off of work surface 116 toward lens 108. Lens 108 collects the radiation reflected from surface 116 and directs it to image detector (e.g., artificial retina) 110. It should be noted that lens 108 can be eliminated with the addition of lenses on either LED 118, image detector 110, or both. Similarly, the lens can simply be eliminated if the radiation is detectable by the detector, such that the image or pattern can be detected, without a lens.

Image detector 110 generates an image signal indicative of an image or pattern on work surface 116. The image signal is provided to controller 112 which, in one illustrative embodiment, computes position information based on the image signal. The position information indicates movement of mouse 42 relative to work surface 116, as will be described in more detail below. Position information is provided by controller 112 in the form of an information packet, through an output such as a cable (not shown), to computer 20 illustrated in FIGS. 1 and 2A. Mouse 42 may also provide the output from controller 112 through a wireless transmission link such as infrared ultrasonic, or radiofrequency links. In an illustrative embodiment, the position information provided by controller 112 is provided according to a conventional format, such as through a serial interface, a universal serial bus (USB) interface, or in any other suitable interface format.

Image detector 110, in one illustrative embodiment, is an artificial retina manufactured by Mitsubishi Electric Corporation and includes a two-dimensional array of variable sensitivity photo detectors (VSPDs) which operates in a known manner. Briefly, the VSPDs are formed by a side-by-side pair of diodes integrated onto and separated by a semiinsulated GaAs layer (pn-np structure). In one embodiment, the array is a 32×32 element array, but could be larger or smaller as desired. The photo detector current depends, both in sign and magnitude, on applied voltage. Such VSPDs exhibit an analog memory affect which stores conductivity information when a voltage is applied in the presence of an optical write pulse. This information is retrieved by injecting an optical readout pulse.

Image processing in such devices is based on optical matrix-vector multiplication. An input image is projected onto the device as a weight matrix. All VSPDs have one electrode connected along rows, yielding a sensitivity control vector. Thus, the VSPD sensitivity can be set to arbitrary values in each row within a certain range. In addition, the remaining VSPD electrode is connected along columns, yielding an output current vector defined by the matrix vector product of the weight matrix times the sensitivity control vector.

In an illustrative embodiment, image detector 110 is controlled to perform edge extraction operations. The sensitivities of two adjacent detector rows are set to +1 and −1, respectively, whereas all other sensitivities are set at 0. In this embodiment, the output current is proportional to the difference in light intensities of the two active rows. By shifting the control voltage pattern in a cyclical manner (0, +1, −1, 0, 0, etc.), the horizontal edges of the input image are sensed. Thus, the system operates in a time sequential and semi-parallel mode.

In one illustrative embodiment, mouse 42 also includes current driver 114 which is coupled to source 104. In that embodiment, controller 112 intermittently senses the intensity of the radiation generated by source 104 and adjusts the current provided to source 104 through current driver 114. In other words, if the sensed intensity is lower than a desired range, controller 112 provides a feedback signal to current driver 114 to boost the current provided to source 104 in order to increase the intensity of the electromagnetic radiation emanating from source 104. If, on the other hand, the intensity of the radiation is higher than a desired range, controller 112 provides the feedback signal to current driver 114 to reduce the current provided to source 104 to thereby reduce the intensity of the radiation emitted from source 104. This may be done, for example, to reduce the overall power consumption of mouse 42.

Figure 4:
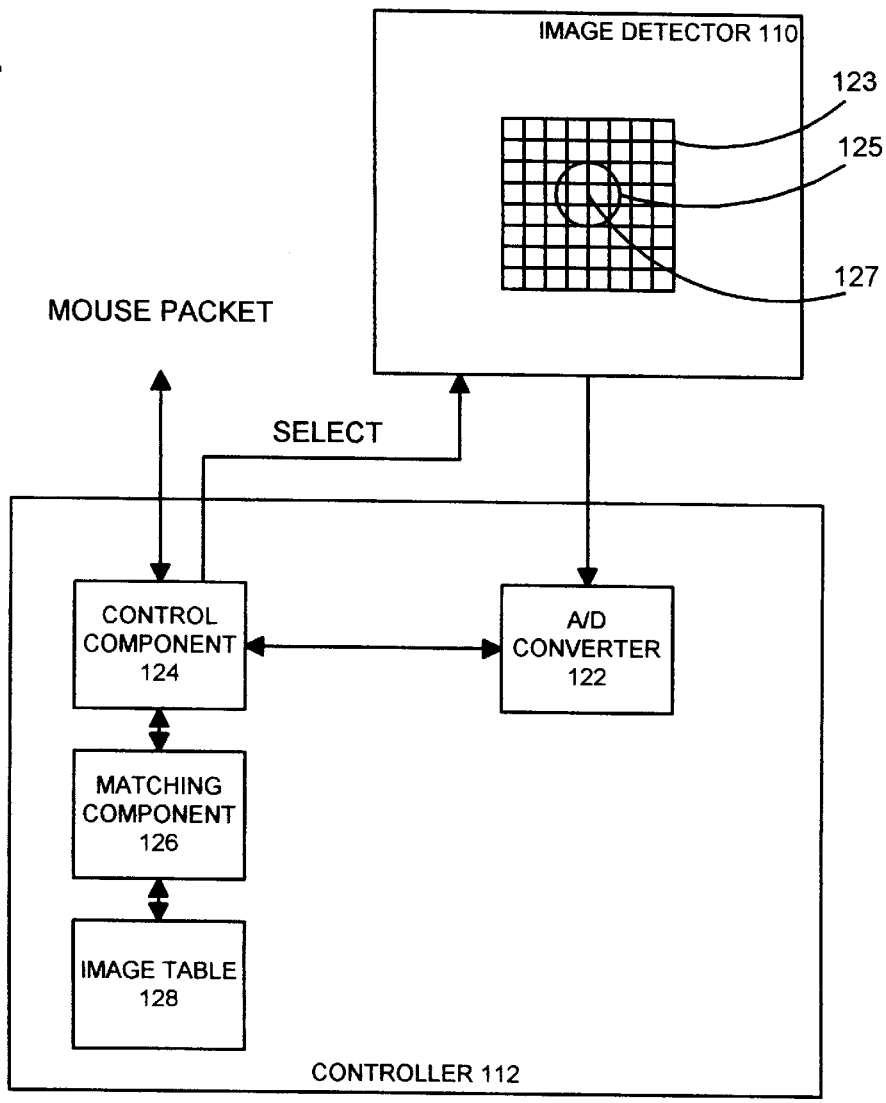
FIG. 4 is a block diagram illustrating use of the pointing device shown in FIG. 3 in conjunction with a mouse pad or work surface having a predetermined pattern thereon.
Figure 5A:
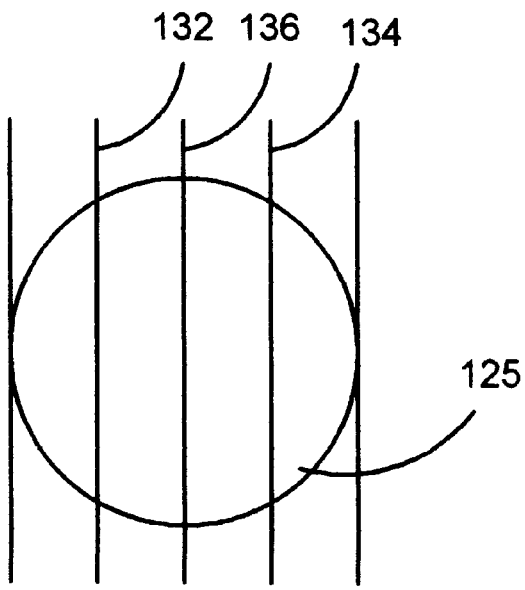
FIGS. 5A and 5B illustrate operation of the input device in recognizing the predetermined pattern shown in FIG. 4.
Figure 5B:
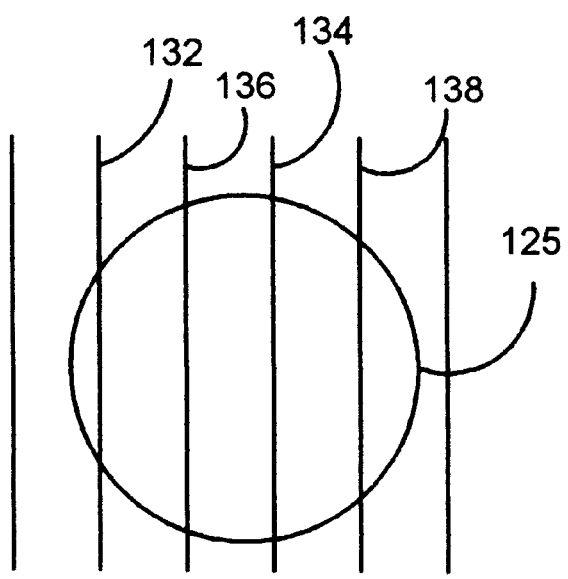

FIGS. 4 and 5A–5B illustrate the operation of mouse 42 in accordance with one aspect of the present invention. Controller 112 includes A/D converter 122, control component 124, image matching component 126 and image table 128. FIG. 4 also illustrates image detector 110 showing the 32×32 VSPD (pixel) array 123 onto which the image from surface 116 is directed. The entire viewing area 123 of image detector 110 is coincident with the 32×32 pixel array. However, defined within the entire viewing area 123, is sample area 125. Sample area 125 is smaller than the viewing area and includes, in one illustrative embodiment, approximately a 10 pixel by 10 pixel area centered generally around a center 127 of viewing area 123. In the embodiment shown in FIG. 4, the image on surface 116 is simply a grid pattern.

In operation, controller 112 first activates source 104 such that radiation is impinged on work surface 116. Mouse 42 can operate on a surface having a predefined pattern (such as the grid structure) or without a predefined pattern. For example, substantially every surface has some irregularities or surface roughness, if only at the microscopic level. A commercially available artificial retina is capable of resolving images which are only a few microns in size, assuming the light source is powerful enough. Thus, the radiation is reflected off of surface 116 back to impinge on viewing area 123, carrying with it information indicative of either a predetermined pattern on surface 116 or an image or pattern formed by the surface roughness on surface 116.

In the embodiment in which controller 112 is not looking for a predetermined pattern on work surface 116, the analog signal indicative of the pattern formed by the surface roughness of surface 116 is provided to A/D converter 122. A/D converter 122 converts the signal into a digital value which is provided to control component 124. Control component 124 executes one of any number of suitable algorithms, such as the above-identified edge extraction algorithm, to identify a pattern or image from surface 116 which is reflected on sample area 125. This information is stored by control component 124 in a memory associated therewith. Control component 124 then waits for a predetermined time out period which is illustratively determined based on a maximum expected velocity of the mouse over surface 116. In one illustrative embodiment, the time out duration is approximately 1–10 milliseconds.

After the time out period, control component 124 reactivates source 104 (if it has been de-activated), and determines whether the image within sample area 125 has moved. Movement of the image within sample area 125 is indicative of relative movement between mouse 42 and surface 116. Based on detected movement, control component 124 provides position information in a customary and acceptable format (such as packet 66 illustrated in FIG. 2B) at an output (such as through a cable). This information is used for any number of things, including the movement of a mouse cursor on the computer display.

After movement of the image or pattern within viewing area 125 is detected, a new image or pattern within sample area 125 is detected. Image data, indicative of the new image, is then stored by control component 124. Control component 124 then again waits for another time out period and determines whether the new image has moved. This process continues such that mouse 42 continues to provide position information indicative of the relative movement of mouse 42 and work surface 116.

Detection of movement of the image in sample area 125 can be accomplished in a number of fashions. Such techniques include cross-correlation, circular harmonics, pattern moment characteristics, and chord histogram detection. Rotational movement of mouse 42 with respect to surface 116 can also be detected, if desired. In one illustrative embodiment, lens 120 is shaped to transmit radiation in an elongate, or elliptical, pattern. Therefore, if the mouse is rotated, rotation of the elliptical shape can be detected as well. All of these techniques are described in greater detail in the above-identified co-pending U.S. patent application.

Controller 112 can also be configured to detect a predetermined pattern (such as the grid structure) within viewing area 123, and to detect movement of the predetermined pattern relative to mouse 42. For example, FIGS. 5A and 5B illustrate the movement of a predetermined pattern within sample area 125. In the embodiment illustrated in FIGS. 5A and 5B, the predetermined grid pattern (shown with vertical lines only for the sake of clarity) is formed of alternating blue and red lines such that the radiation reflected back to image detector 110 carries with it information of whether blue or red grid lines are within sample area 125. Of course, the alternating grid lines could be formed of alternating thickness, of different shades, or have other distinguishing characteristics which allow control component 124, when it detects the image, to identify the alternating grid lines.

In FIG. 5A, two blue lines 132 and 134 are within sample area 125, and one red line 136 is within sample area 125, between blue lines 132 and 134. After movement of the mouse, a new pattern resides within sample area 125, as illustrated in FIG. 5B. The new pattern shows that lines 132, 134 and 136 have shifted to the left relative to sample area 125, and that another red line 138 has entered the right side of sample area 125.

The sample rate of image detector 110 is illustratively high enough, again based on the expected maximum velocity of the mouse, that mouse 42 cannot be moved one full grid spacing before a new image is taken. In one illustrative embodiment, control component 124 assumes a predetermined, constant distance between grid lines. In that way, control component 124 simply needs to track the number of grid lines which pass through sample area 125, and the direction of movement of those grid lines, in order to determine the distance and direction which mouse 42 has moved relative to surface 116. Of course, this is illustratively carried out for grid lines in both the X and Y directions. Control component 124 then generates a mouse packet, similar to that illustrated in FIG. 2B, which is indicative of the movement of mouse 42 relative to surface 16.

VARIABLE RESOLUTION OPERATION

Figure 6:
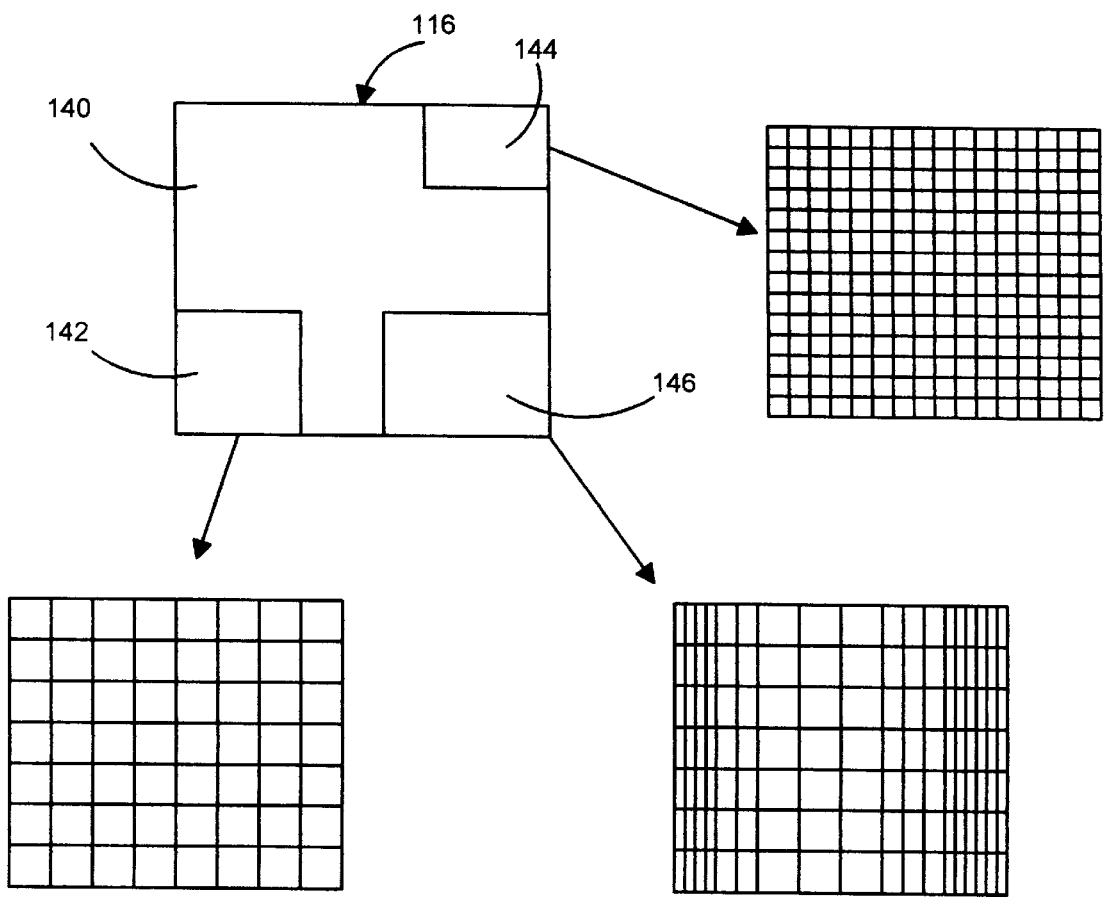
FIG. 6 illustrates a mouse pad or work surface having a variety of predetermined patterns disposed thereon for providing an input device with a variable resolution.

FIG. 6 illustrates a mouse pad, or surface, 116 having four different zones 140, 142, 144 and 146 disposed thereon. Zone 140 on surface 116 has no predetermined pattern thereon. Section 142 has a grid line pattern of uniformly spaced grid lines. Zone 144 has a high resolution grid line pattern in which the grid line are uniformly spaced, but are spaced closer than those in zone 142. Zone 146 also has a grid line pattern, but the pattern in non-orthogonal in that the spacing between the grid lines varies from one side of zone 146 to another side of zone 146. Zones 140–146 allow mouse 42 to operate in a variable resolution manner without the need for changing a device driver, and without invoking a control panel applet.

When mouse 142 is over zone 140, control component 124 provides position information based on random (or in any case non-predetermined) patterns as discussed above. In other words, control component 124 takes periodic "snapshots" of patterns or images identified within sample area 125 based on surface roughness in zone 140, and determines movement of those images relative to sample area 125 to provide position information.

However, when mouse 42 is moved over resolution zone 142, control component 124 identifies the grid line structure beneath mouse 42. Since the grid lines are illustratively far more pronounced than the surface roughness of surface 116, control component 124 can easily identify that mouse 42 is over a zone which has a predetermined pattern thereon. Therefore, when mouse 42 is over zone 142, control component 124 simply processes the images as discussed above with respect to FIGS. 5A and 5B, counting the grid lines along both axes which pass through sample area 125, to determine movement of mouse 42.

Similarly, when mouse 42 is moved over high resolution zone 144, control component 124 can quickly determine that mouse 42 is over a zone having a predetermined pattern thereon, and operates in the mode discussed with respect to zone 142. Recall that control component 124 is configured to assume a predetermined distance between grid lines. While grid lines in zone 144 are uniformly spaced, they are spaced much closer than those in zone 142 (e.g., the grid lines in zone 144 have a spacing which is half that of the grid lines in zone 142). Control component 124 is simply counting the number of lines which pass through sample area 125. Therefore, for a given amount of movement of mouse 42 relative to zone 144, control component 124 will provide position information indicating that mouse 42 has moved twice as far as the same amount of relative movement of mouse 42 with respect to zone 142. By simply moving mouse 42 from zone 142 to zone 144, the user can effectively half the scale of mouse 42 and double its resolution, without changing any software and without accessing the control panel.

Zone 146 also has a grid pattern disposed thereon. However, unlike zones 142 and 144, the spacing between the grid lines in zone 146 varies across the zone. As illustrated in FIG. 6, the spacing of the grid lines in a central region of zone 146 is the largest, while the spacing between the grid lines on either end of zone 146 (and top to bottom) decreases toward the edges of zone 146. As described with respect to zones 142 and 144, control component 124 detects that mouse 42 is over a region having a predefined pattern thereon. The resolution and scale of mouse 42 changes as it is moved across zone 146, based upon the change in the spacing of the grid lines in zone 146. Therefore, the user can convert mouse 42 into a variable scale and variable resolution input device simply by placing the mouse over zone 146, again without making any changes to the device driver and without invoking a control panel applet.

DETECTION OF SPECIALLY CODED IMAGES

Controller 112, in conjunction with image sensor 110, is illustratively configured to detect substantially any image on surface 116, whether it is a predefined image, or a random image indicative of surface roughness. Therefore, mouse controller 112 and image detector 110 can also detect specially coded images, which have a special meaning, and which are disposed on surface 116.

Figure 7:
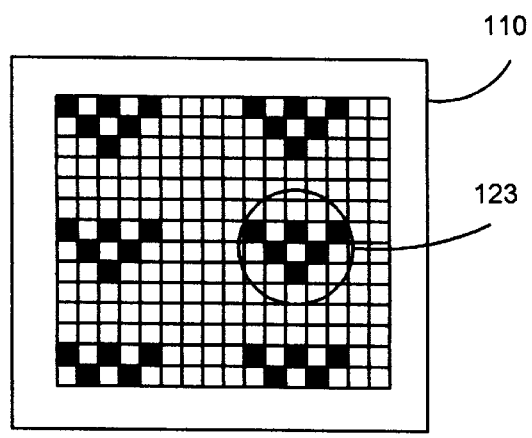
FIG. 7 is a view of a mouse pad or work surface having predetermined coded images disposed thereon.

FIG. 7 illustrates a very simple coded pattern which can be repeated in a given zone on surface 116.

Figure 8:
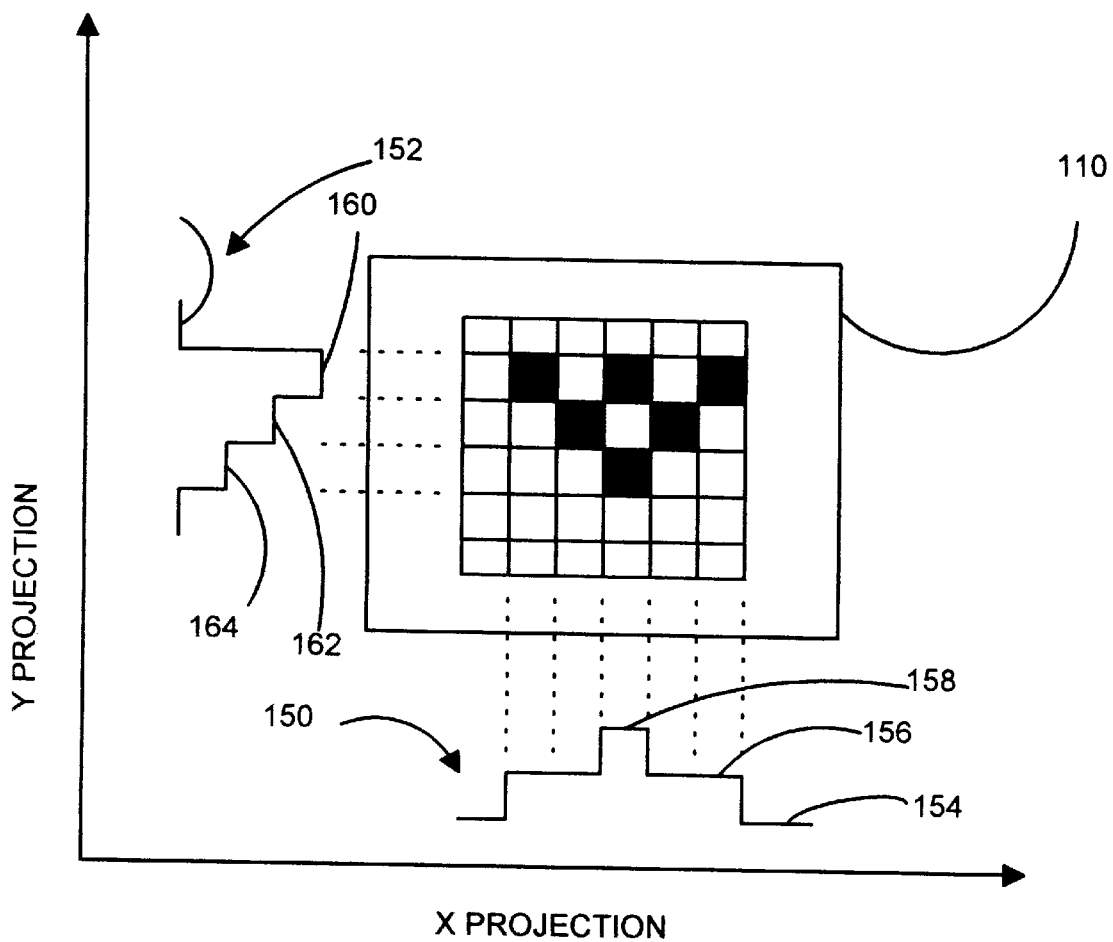
FIG. 8 is a diagram which illustrates projection of the predetermined coded images on an X-Y coordinate system.

In one illustrative embodiment, the coded patterns are identified by control component 124 using a simple projection technique illustrated in FIG. 8. The array of pixels in image sensor 110 can be controlled to provide an output which represents a sum of the active pixels in each row, and in each column. This information is projected on the XY axes as illustrated in FIG. 8.

In other words, the pattern illustrated in FIGS. 7 and 8 is an inverted triangular pattern which, when reflected on the detector array, activates three pixels at its base and, one at its inverted pinnacle end. The pattern can be projected onto a single axis and represented by a voltage signal 150 on the X axis and a voltage signal 152 on the Y axis. Signal 150 has a first level 154 which is indicative of no active pixels in the viewing area. Signal 150 also has a second level 156 which is indicative of a single active pixel in the viewing area. Further, signal 150 has a third level 158 indicative of two active pixels in the viewing area. Thus, signal levels 154, 156 and 158 represent a sum of the signals generated by the active pixels, associated with the image, when projected on the X axis.

Signal 152 illustrates projection of the image onto the Y axis. Signal 152 has a first level 160 which is indicative of three active pixels and second and third levels 162 and 164 which are indicative of two active pixels, and one active pixel, respectively.

Upon receiving these digitized signals, control component 124 identifies the coded pattern and provides it to matching component 166. Matching component 166 accesses an image table 128 which stores data indicative of all coded images which can be recognized by controller 112. Matching component 126 uses any suitable, and preferably simple, matching algorithm to match the image identified by control component 124 to a predetermined coded image stored in image table 128. Illustratively, image table 128 not only stores data indicative of the images to be recognized but also includes a value associated with the recognized image, and which can be used in the mouse packet generated by control component 124 in passing the desired information back to computer 20.

Figure 9:
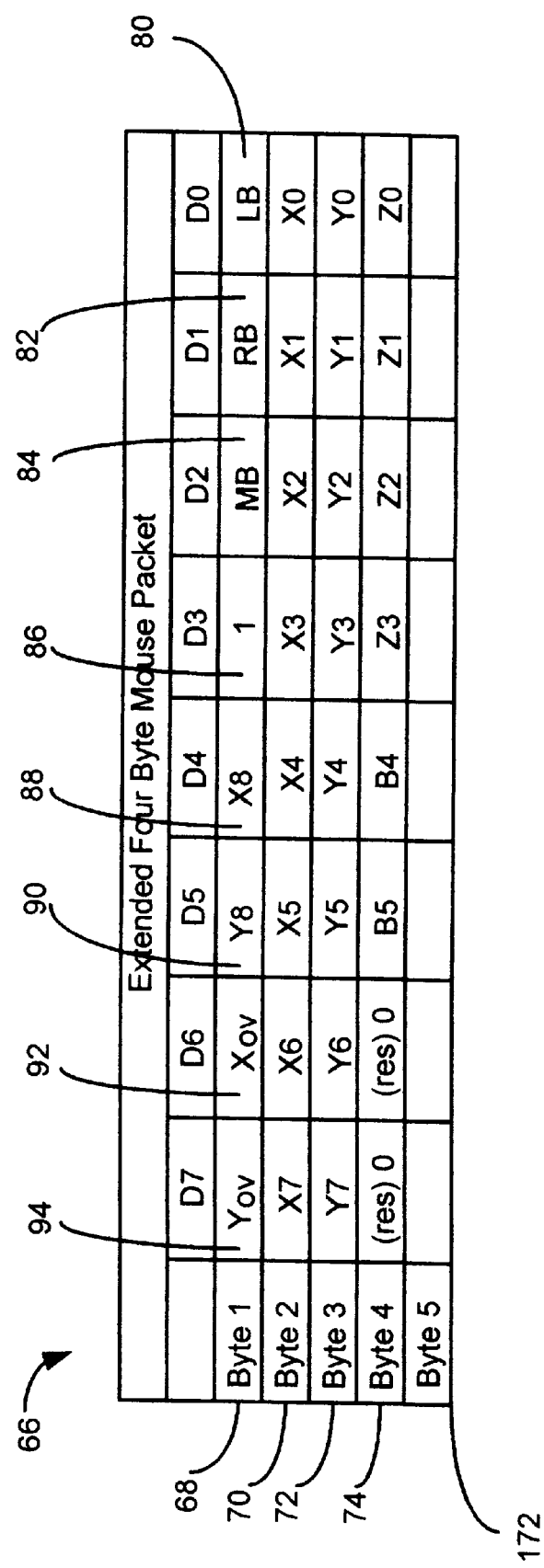
FIG. 9 illustrates a packet of information generated by an input device in accordance with one embodiment of the present invention.

In order to generate the mouse packet, control component 124 preferably generates a new mouse packet generally illustrated by the number 170 in FIG. 9. Packet 170 is similar to packet 66 illustrated in FIG. 2B, except that it includes an additional byte 172 of information. Byte 172, as with the other bytes in packet 170, preferably includes eight bits of information which are used to encode the fact that control component 124 has, indeed, recognized a predetermined image which resides in image table 128, and which also includes the value in image table 128 associated with the coded pattern which has been identified.

By way of example, the coded pattern illustrated in FIG. 7 can be repetitively disposed on surface 116 to indicate that computer 20 is to operate in a certain mode, or is to change modes. In one illustrative embodiment, when the coded pattern illustrated in FIG. 7 is detected, a function/mode change value associated with that pattern in image table 128 indicates that computer 20 is to operate in a vision impaired mode, in which all fonts are dramatically increased in size, above a nominal level.

Figure 10B:
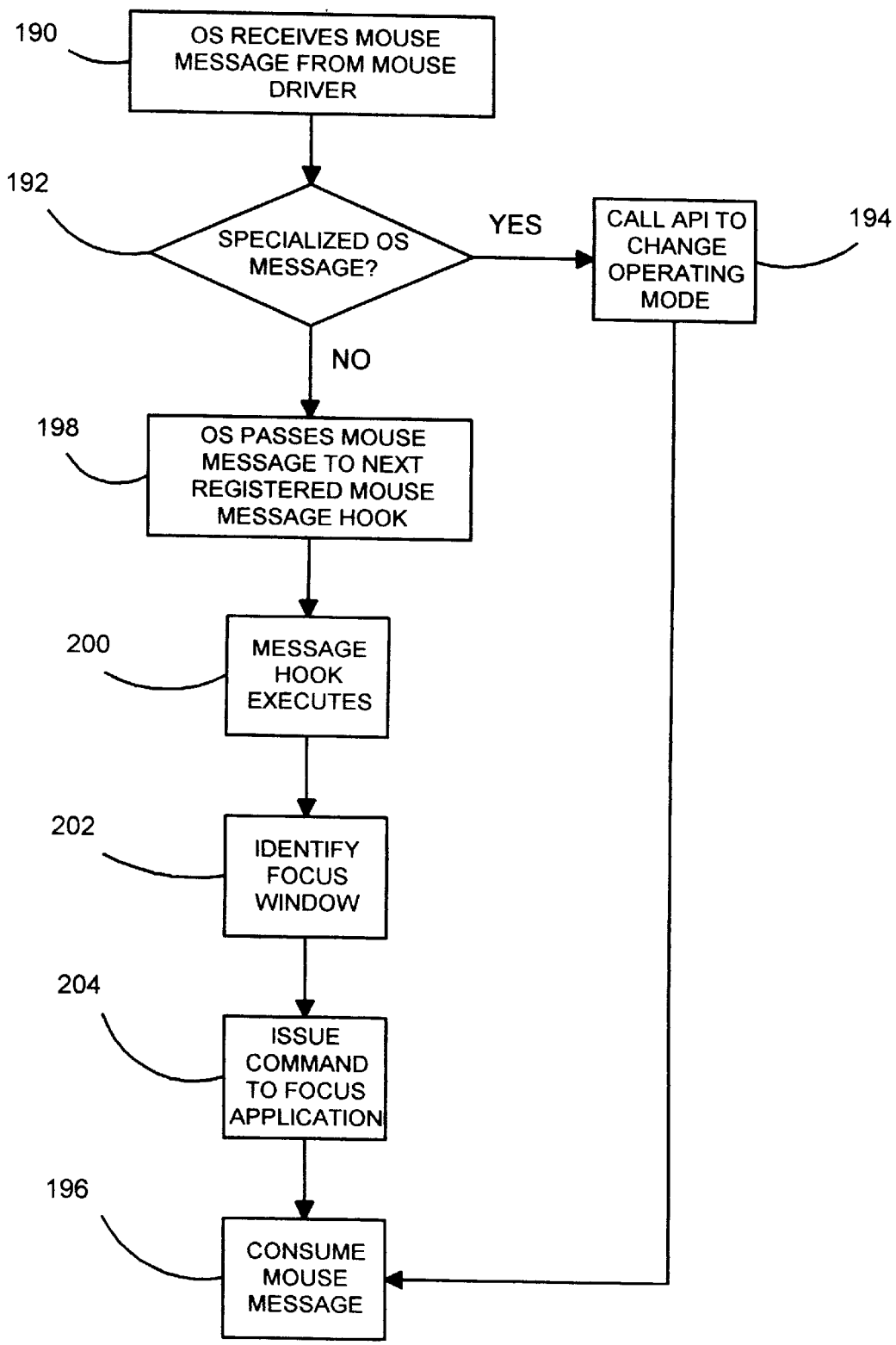

FIGS. 10A and 10B depict a flow diagram illustrating the operation of mouse 42 and computer 20 under such circumstances. First, the user manipulates the mouse as indicated by block 174. In other words, the user simply moves or places the mouse over a region or zone of surface 116 which contains the repetitive coded patterns. Next, image sensor 110 detects the image and passes the data indicative of the detected image to control component 124. Control component 124 then identifies the image, as discussed above, and passes the image to matching component 126. This is indicated by blocks 176 and 178.

Matching component 126 accesses image table 128 and matches the identified image (if possible) to an image contained in image table 128. This is indicated by block 128. Matching table 126 then passes the function/mode change value associated with the matched image from image table 128 to control component 124. Control component 124, in turn, generates the mouse packet with the function/mode change value contained in byte 5 of the packet. This is indicated by block 182.

Control component 124 then passes the packet to serial interface 46, as indicated by block 184. Serial interface 46 converts the serial mouse packet into parallel mouse packet information and provides that information to mouse driver 60. Mouse driver 60 examines the information in byte 5 and creates a mouse message based on the function/mode change information which is in turn based on the predetermined coded pattern which has been identified. This is indicated by blocks 186 and 188. Mouse driver 60 passes the mouse message to operating system 35, as indicated by block 190.

It should be noted that the mouse message can be a specialized message intended for the operating system. For example, in order to operate in a vision impaired mode, the mouse message may indicate to the operating system that the font size needs to be increased. Determination of whether mouse message is a specialized message is indicated by block 192. If the mouse message is a message intended for the operating system, the operating system takes the necessary steps to change the operating mode of computer 20, based upon the information in the mouse message. This is indicated by block 194. In the instance where computer 20 is to change to a vision impaired mode, the operating system invokes a control panel change of the font size to a desired level, such as by calling an API. The operating system then consumes the mouse message. This is indicated by blocks 194 and 196.

If, at block 192, it is determined that the mouse message is not a specialized message intended for the operating system, the operating system simply passes the mouse message to registered mouse message hooks. This is indicated by block 198. The message hook may be registered by an application which is configured to utilize the information contained in the mouse message. Such information may, for example, indicate that a command is to be passed to the application which owns the window currently under focus in computer 20. Therefore, the message hook executes by identifying the focus, as indicated by blocks 200 and 202. The message hook then issues the desired command to the focus application and consumes the mouse message. This is indicated by blocks 204 and 196.

While the above discussion has proceeded with respect to changing the operating mode of computer 20 from a normal vision mode to a vision impaired mode, the present technique can be used to make substantially any changes to the operating mode of computer 20. Change of font size is but one example. It should also be noted that, while mouse 42 can identify coded images on surface 116, it can simultaneously provide position information based either on movement of the coded images within sample area 123, or based on movement of images created by the surface roughness of surface 116 within sample area 123, both of which are described above. In that case, mouse packet 170 not only includes information contained in byte 5, but also includes position information indicative of the movement of mouse 42 in the X and Y directions. Of course, mouse 42 can also simultaneously provide information in packet 170 which is indicative of the actuation of buttons and the rotation of the wheel on mouse 42.

Further, mouse pads are illustratively used which contain different coded messages on opposite sides thereof. In other words, the impaired vision code can be provided on one side of the mouse pad, and repeated across the entire surface of the mouse pad, along with grid lines having various zones such as those shown in FIG. 6. In that instance, a single side of the mouse pad provides an indication to computer 20 that it is to operate in the vision impaired mode, and also provides the user with the variable resolution capability discussed above with respect to FIG. 6. At the same time, the opposite side of the mouse pad can contain the same variable resolution zones (or any other suitable pattern) without the vision impaired coded symbols thereon. Thus, if the user is vision impaired, the user can simply flip over the mouse pad, place mouse 42 on the pad, and computer 20 will automatically switch to a vision impaired mode.

Figure 11:
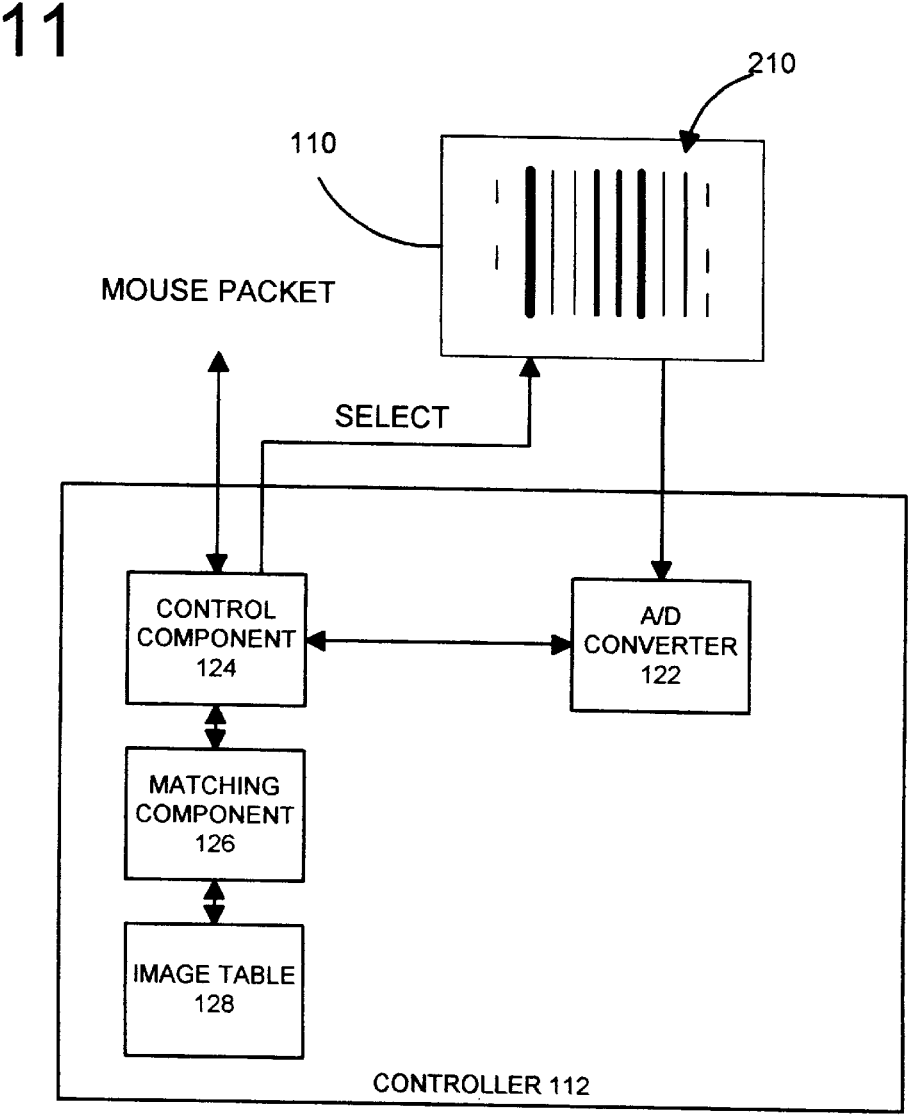
FIG. 11 his a block diagram illustrating the use of an input device to provide specialized messages to the computer in accordance with another embodiment of the present invention.

The present invention can also be used to accomplish other desired functions. For example, mouse 42 can also be used as user input device for inputting a user ID or password to perform a logon operation. FIG. 11 is a block diagram similar to that shown in FIG. 4, and similar items are correspondingly numbered. However, FIG. 11 illustrates a different image 210 which is disposed on surface 116. In the embodiment illustrated in FIG. 11, image 210 is illustrated as a barcode. However, any other recognizable image can be used. Image 210, in one embodiment, is placed on a personalized mouse pad, or an ID badge which a user carries for security purposes, or on another similar personalized item.

In some conventional computer systems, a logon procedure is required before the user is permitted access to certain aspects of the computer system. When a computer is booted up, the boot-up sequence may require the operating system to call a logon application which generates a user interface requiring the user to input identifying information, such as a name or ID number, as well as a password. Based on this user input information, the logon application can allow the user full access of the computer system, only partial access (where different levels of security are implemented), or no access at all (such as where the user input information reflects that the user is not authorized to have any access to the system).

For example, some financial or billing system applications only allow authorized users to have access to certain data bases containing confidential financial information. Similarly, in a network environment, some logon applications will control access to the network drives based on the user's identity and security level. Further, automatic logon procedures implemented in systems utilizing the "WINDOWS" brand operating systems require the user to reboot the computer (such as by executing the CTL-ALT-DEL key sequence) before the logon procedure will be executed. Such logon operations can be somewhat cumbersome.

Therefore, the present invention provides a system by which logon can be accomplished simply by placing mouse 42 over a coded image which contains the user's personal logon information, or by scanning mouse 42 across an image (such as the barcode illustrated in image 210) which encodes the user's personal logon information.

Where the coded image is small enough that it can be recognized by controller 112 without moving mouse 42 (i.e., where it is small enough that it will appear within viewing area 123 in its entirety, the image is simply processed as any other coded image, as described above. In other words, the image is captured by image detector 110, provided to A/D converter 122 which converts the image signal into a digital signal and is passed to control component 124. Control component 124 then identifies the image and provides it to matching component 126 which matches the identified image to a corresponding image stored in image table 128.

In that instance, image table 128 also includes an associated image value which identifies the image as a user's logon information.

This information is provided back to control component 124 which generates the mouse packet and provides the mouse packet, through serial interface 46, to mouse driver 60. Mouse driver 60, in turn, generates a mouse message which is transmitted to operating system 35. In an embodiment in which operating system 35 handles logon operations, the mouse message is designated as a specialized mouse message for operating system 35. In another embodiment in which a separate application handles the logon procedures, the mouse message is simply designated as a normal mouse message which is to be passed to registered message hook procedures 62. In that case, operating system 35 passes the mouse message to the message hook procedures until it reaches the logon application. The logon application issues commands to other components of computer 20 to configure computer 20 to allow a desired level of access to the user, or to deny the user access and simply issue an error message to the user.

Figure 12A:
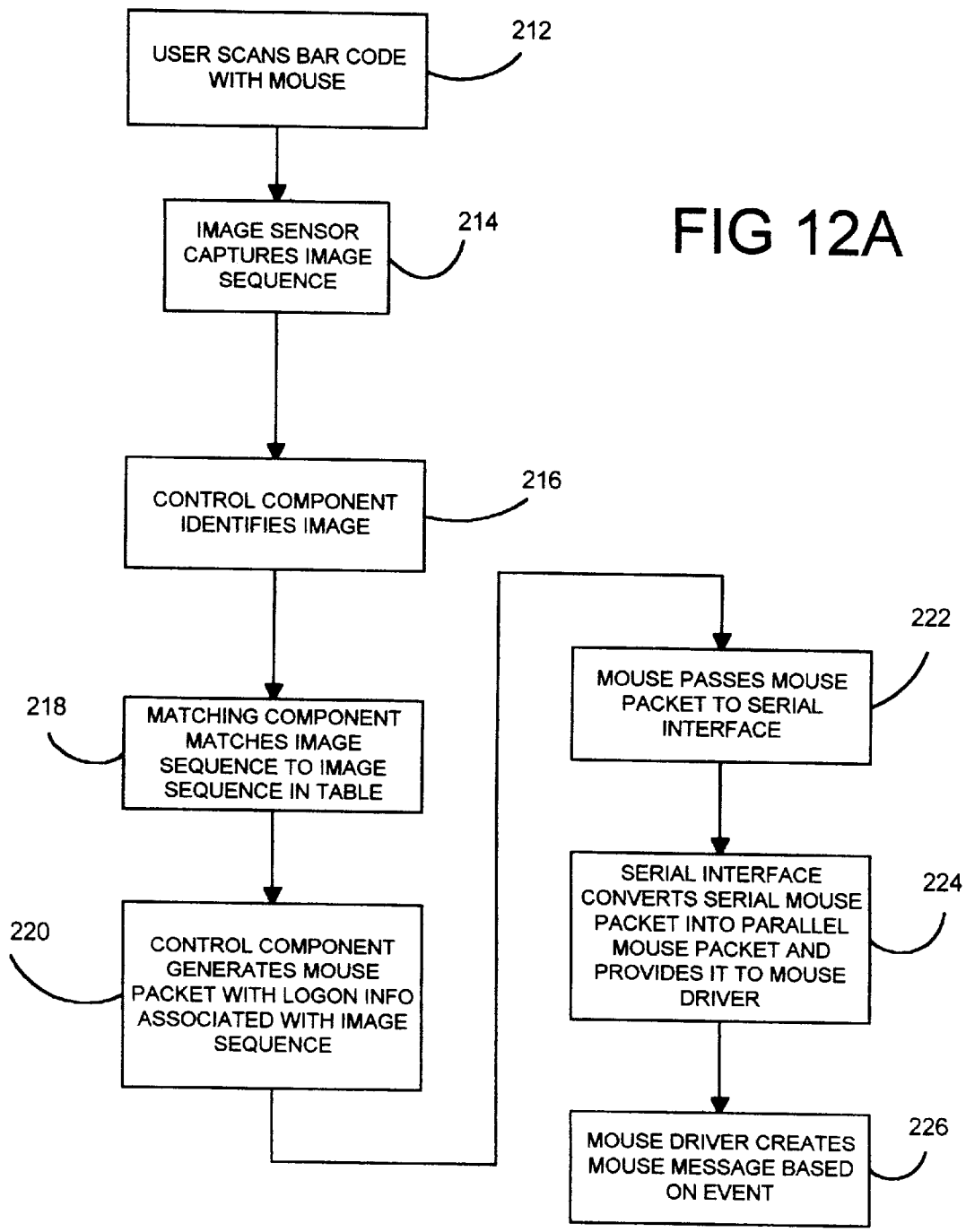
FIGS. 12A and 12B represent a flow diagram illustrating the operation of the input device shown in FIG. 11.
Figure 12B:
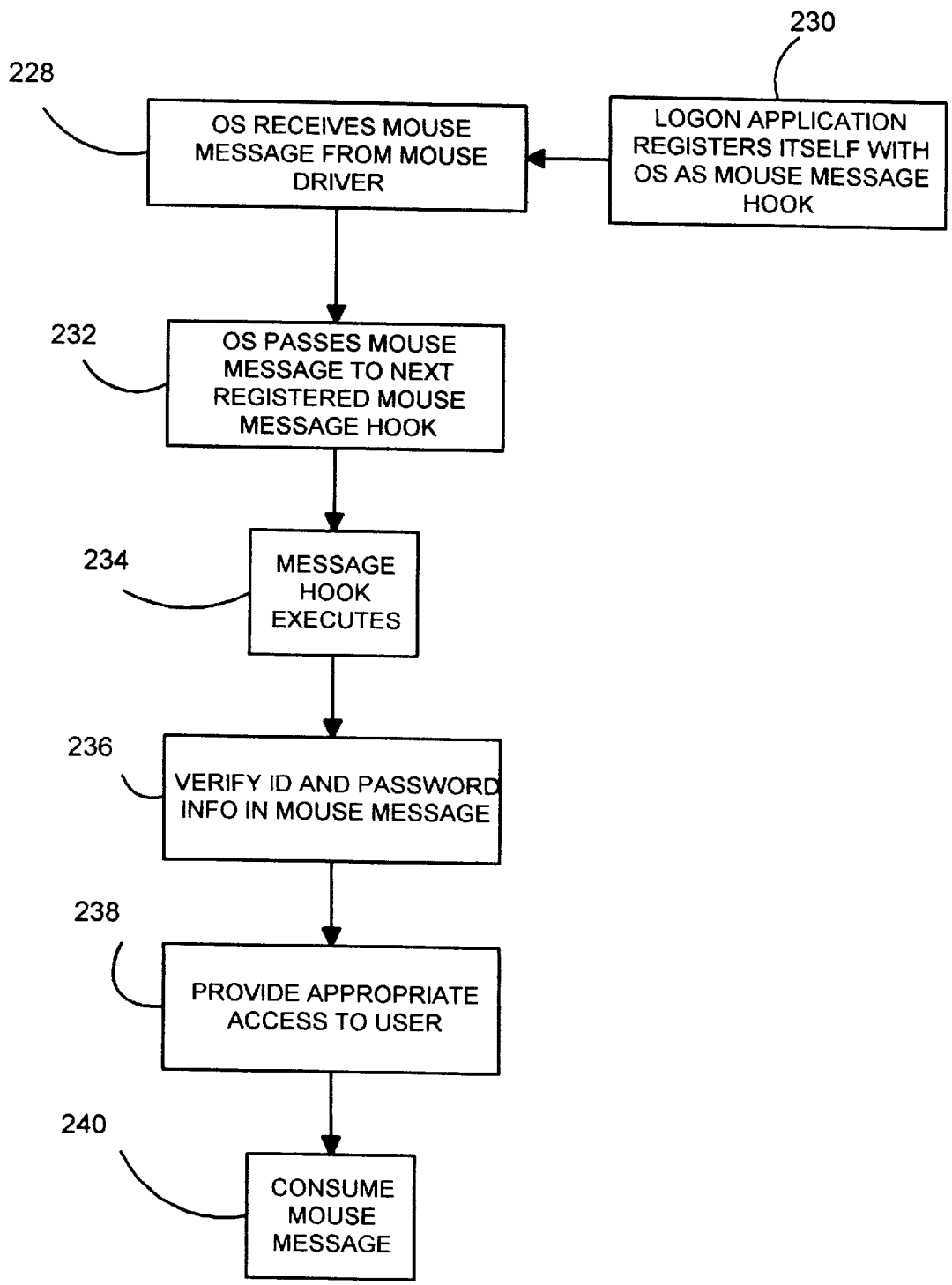

In an embodiment in which mouse 42 is scanned across image 210 (such as where image 210 is a barcode) operation is generally indicated by the flow diagrams illustrated in FIGS. 12A and 12B. It is worth noting at the outset that mouse 42 can be configured to receive a select input from the user (such as depression of one of the buttons) indicating that the user wishes to enter a logon mode.

The user then scans mouse 42 across image 210 as indicated by block 212. By scanning mouse 42 across image 210, a sequence of discrete images will be generated which are indicative of the information encoded in barcode image 210. Image detector 110 captures this image sequence and provides it, in turn, to A/D converter 122 which provides digital information representative of the image sequence to control component 124. This is indicated by block 214.

Control component 124 identifies each image in the sequence of images, as indicated by block 216 and provides the sequence of images to a matching component 126. Matching component 126 matches the image sequence to an image sequence stored in image table 128, as indicated by block 218. Control component 124 receives the associated information from image table 128 and generates the mouse packet including logon information associated with the matched image sequence. This is indicated by block 220. Control component 124 passes the mouse packet to serial interface 46 as indicated by block 222. Serial interface 46 then converts the serial mouse packet into parallel mouse packet information and provides the parallel mouse packet information to mouse driver 60, as indicated by block 224.

Driver 60 creates a mouse message based on the logon event information received, as indicated by block 226, and passes the mouse message to operating system 35 as indicated by block 228. In the embodiment in which the logon procedures are to be handled by an application separate from operating system 35, the logon application must have already registered itself with the operating system 35 as a mouse message hook. This is indicated by block 230.

Operating system 35 then passes the mouse message to a next registered mouse message hook as indicated by block 232 and the message hook procedures are executed as indicated by block 234. In one illustrative embodiment, the message hook simply issues commands to the logon application requesting that the logon application verify the identification and password information in the mouse message. This is indicated by block 236. Commands are then issued from the logon application which configure computer 20 to allow appropriate access to the user. This is indicated by block 238. The message hook associated with the logon application then consumes the mouse message as indicated by block 240. It should be noted that, while the above discussion has proceeded with respect to a logon operation, those skilled in the art will recognize that a technique implemented according to the present invention can be used to perform any other desired functions, or to issue commands to any other applications, as well.

GENERATION OF CUSTOM TEMPLATES

The present invention can also be used to generate custom templates, or printed surfaces, 116 which include customized coded images thereon (printed on paper, Mylar, etc.) which act to customize the system for a specific user or a specific need. For example, some game applications expose additional functionality as the user reaches higher levels in the game. In other words, as the user reaches a certain score, or traverses a certain screen, the game application provides additional "lives" or "ammunition" or provides the user with access to additional "weapons" or other tools or instruments which can be used in the game. Similarly, in some such applications, after the user reaches a certain level, the application triggers a different response through the utilization of an existing tool or implement. The present invention can be used to enhance the functionality of such games.

Figure 13:
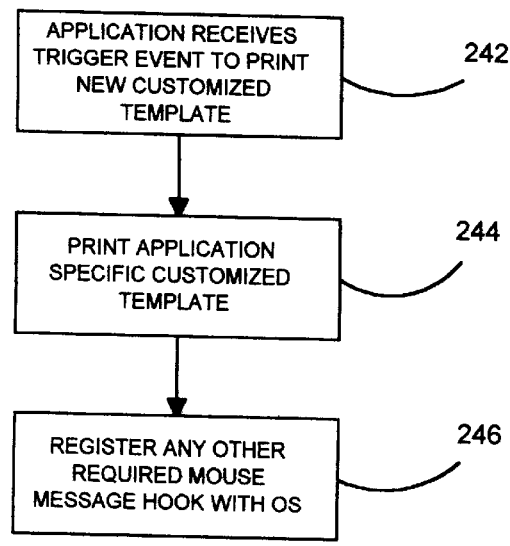
FIG. 13 is a flow diagram illustrating the operation of an application in conjunction with an input device in accordance with another embodiment of the present invention in which the application generates a sheet having application specific images disposed thereon.

In order to enhance functionality, the application is configured to print out a customized template for placement on surface 116. The template includes customized encoded images which are read by mouse 42 and result in the creation of a mouse message which is interpreted by the application to modify the functionality of the application. This process is generally indicated by the flow diagram set out in FIG. 13.

First, the application receives a trigger event to print a new customized template containing the customized encoded images. This is indicated by block 242. As discussed above, this event can simply be that the user reaches a predetermined level in a game. The trigger event can also correspond to the user entering or scanning in a secret code which has been revealed by the application to the user. In the embodiment in which the user scans such a secret code with mouse 42, the code is transmitted to the application using (for example) the protocol identified above with respect to FIGS. 10A and 10B.

The application then issues commands to print out the application specific, customized template. This is indicated by block 244. Also, of course, the application must register any other required mouse message hooks with operating system 35, such that it will receive mouse messages containing information indicative of the customized coded images on the new template. This is indicated by block 246. The new template is then placed on surface 116 and used by the user.

It should be noted that while the above discussion has proceeded with respect to a games application, the invention is not so limited. Those skilled in the art will recognize that the invention can be utilized to print out any template which is customized to an application, regardless of the application in which it is used.

USE OF A MOUSE 42 AS AN ABSOLUTE POSITION DEVICE

Figure 14:
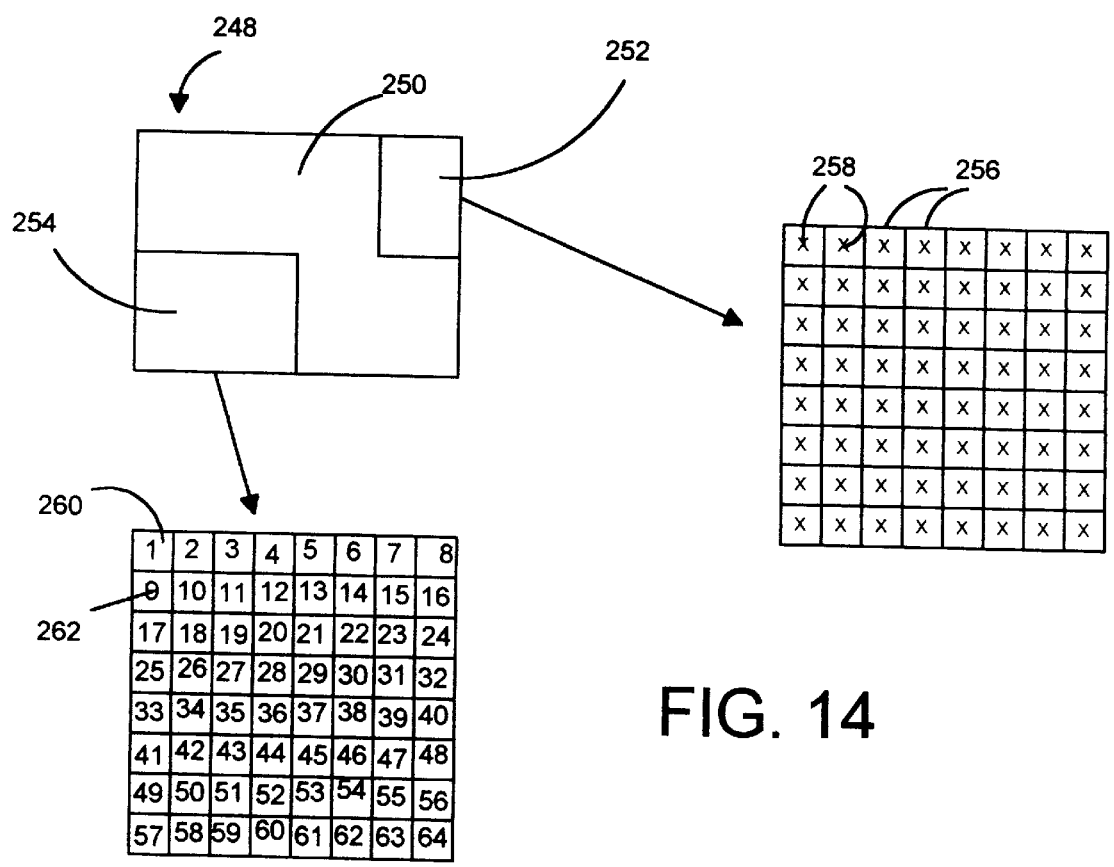
FIG. 14 illustrates another mouse pad or work surface having a variety of patterns or images disposed thereon.

The present invention can also be utilized to selectively convert mouse 42 from a relative position device to an absolute position device. This is illustrated in FIG. 14. FIG.

14 illustrates mouse pad or template 248 which has three separate zones 250, 252, and 254 disposed thereon. In one embodiment, zone 250 either has no predetermined pattern thereon, or has a grid structure pattern, or other similar pattern such as that described with respect to FIGS. 5A and 5B. Thus, when mouse 42 is over zone 250, it simply acts as a relative positioning device.

Zone 252 has a repetitive code disposed thereon. In other words, zone 252 has a number of cells 256, each cell containing the same coded symbol 258. The repetitive coded area in zone 254 can be used, as discussed above, to place computer 20 in a desired mode of operation, and can also be used to generate relative position information corresponding to movement of mouse 42 over zone 252.

However, template 248 also includes zone 254 which contains a plurality of cells 260, each encoded with a unique coded image 262. Since each coded image 262 in cells 260 is different from the other encoded images 262 in other cells 260, placement of mouse 42 over zone 254 can be used to convert mouse 42 into an absolute positioning device.

Each of the unique coded images 262 are stored in image table 128. Each of the coded images also has a value associated therewith (in image table 128) which is indicative of an absolute position of mouse 42 within zone 254. Therefore, when a coded image 262 is identified by control component 124, it is passed to matching component 126 which matches the coded image to a corresponding image in image table 128. Image table 128 then provides the absolute position information to control component 124 which generates the mouse packet passed to computer 20, including the absolute position information. This absolute position information can be used to place a cursor on the display screen of computer 20 at a predefined position which corresponds to the absolute position information, regardless of the relative movement of mouse 42. In that way, mouse 42 can be picked up, off of template 248, and set down at another location within zone 254. The cursor will then be moved to another position on the display screen corresponding to the absolute position read from zone 254 over which the mouse is then placed.

GENERATION OF IMAGES IN IMAGE TABLE 128

Figure 15A:
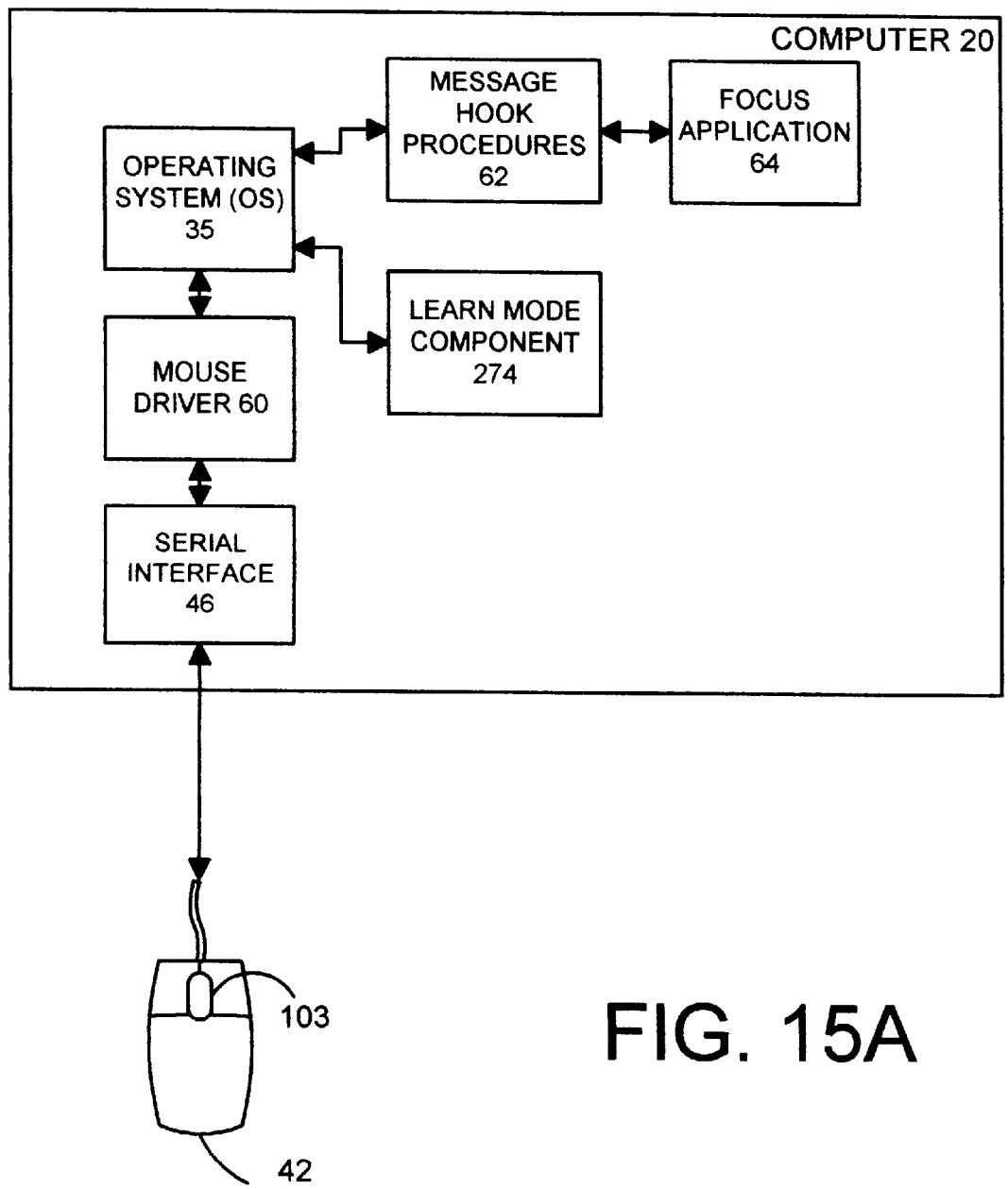
FIG. 15A is a functional block diagram illustrating the use of an input device in a learn mode in accordance with another embodiment of the present invention.
Figure 15B:
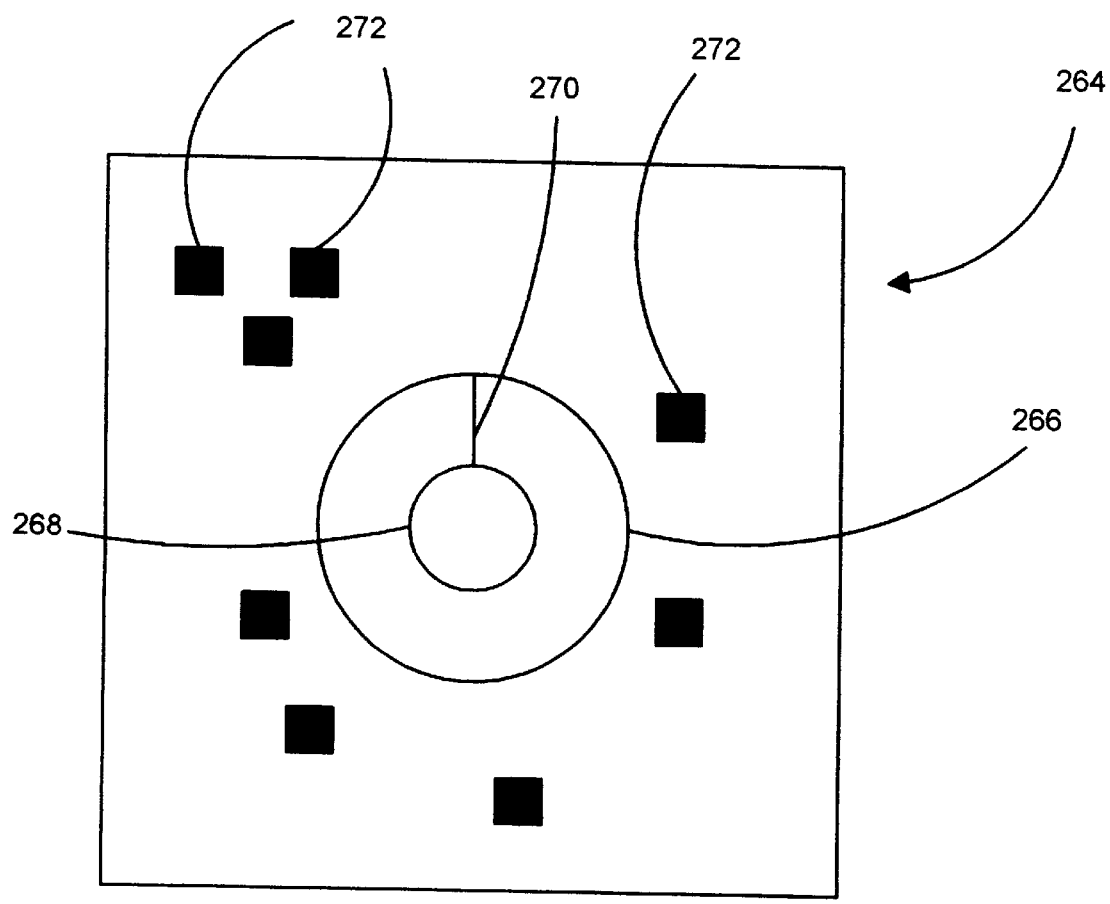
FIG. 15B illustrates one illustrative embodiment of an orientation compensating code.
Figure 16:
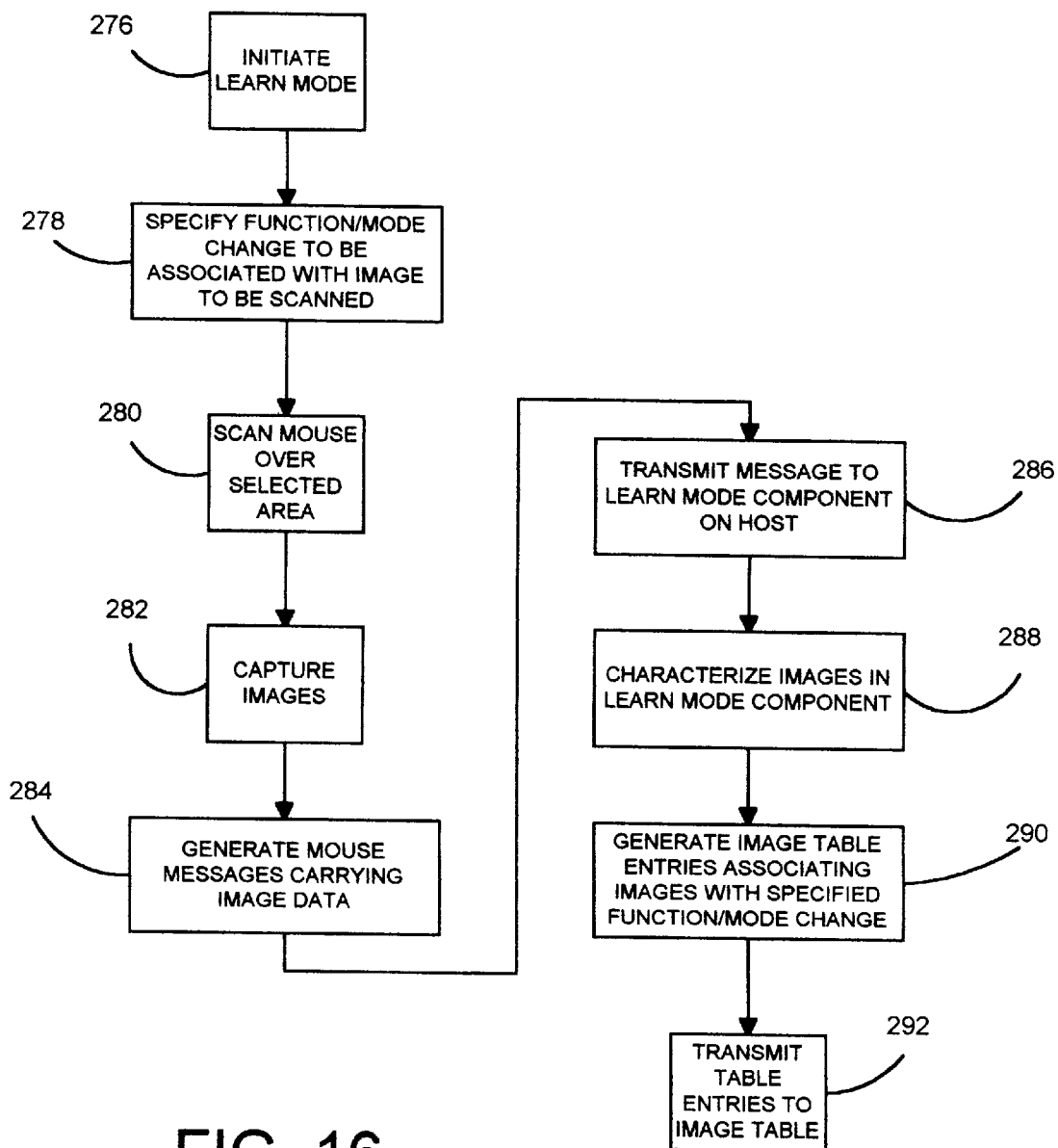
FIG. 16 is a flow diagram illustrating operation of an input device and computer in a learn mode in accordance with one embodiment of the present invention.

It will be appreciated that, prior to matching identified images to images which reside in image table 128, the images must be somehow generated and placed in image table 128. FIGS. 15A, 15B and 16 illustrate a number of embodiments for accomplishing this.

At the outset, the images can be preformed images which are simply loaded into computer 20. The preformed images are then downloaded to control component 124 in controller 112 which places the images in image table 128. Downloading the images can be accomplished using any suitable protocol. For example, an image loading component in computer 20 can access the preformed images stored in computer 20 and generate image packets which are passed to operating system 35. In that instance, mouse driver 60 is provided with an image packet transmission component which receives the image packets from operating system 35 and provides them in parallel, to serial interface 46. Serial interface 46 then serializes the packets and provides them, through a suitable link, to control component 124 which simply places the images in image table 128. These images are then used by matching component 126 in matching images captured by image detector 110 and identified by control component 124.

While the preformed images can take substantially any form, in one illustrative embodiment, they are orientation compensating codes. For instance, the codes will be recognizable by control component 124, regardless of the angular orientation of mouse 42, in the plane of surface 116 over which it is disposed. Therefore, if the user slightly rotates mouse 42 in the plane of surface 116 as the user moves mouse 42 relative to surface 116, the coded image will be constructed such that it can be identified regardless of the particular orientation of mouse 42.

FIG. 15B is one illustrative embodiment of such a coded image. FIG. 15B shows a coded image 264 which contains a pair of concentric circles 266 and 268, and an orientation marker 270. Image 264 also contains a plurality of coded image cells 272 which contain information indicated by a coded message 264. When the image signals indicative of image 264 are provided to control component 124, control component 124 uses a simple algorithm to identify concentric circles 266 and 268, and marker 270. Based on the location of marker 270, control component 124 can easily determine the orientation of image 264 relative to mouse 42, and can then proceed to examine the remainder of image 264 for the information in cells 272.

While a wide variety of such orientation compensating codes can be used, and while orientation compensating codes do not necessarily need to be used in all embodiments of the present invention, some such orientation compensating codes are commercially available and are designated by the term USS-MaxiCode system. Codes utilizing this system also exhibit certain fault tolerance characteristics which may be desirable.

Not only can the coded images be preformed and downloaded from computer 20 to mouse 42, but they can be learned by computer system 20 and mouse 42 as well.

FIG. 15A is a functional block diagram illustrating computer 20. FIG. 15A is similar to FIG. 2A, and similar items are correspondingly numbered. However, FIG. 15A illustrates that computer 20 is also provided with a learn mode component 274. Learn mode component 274 is illustratively associated with a learn mode application which has registered a message hook with operating system 35.

FIG. 16 is a flow diagram illustrating operation of mouse 42 and computer 20 in the learn mode. First, the user initiates the learn mode. This can be done simply by placing the mouse over a precoded pattern on the mouse pad, by depressing an actuator button on the mouse, by depressing a key or key sequence on the keyboard, etc. In response to learn mode initiation, operating system 35 calls learn mode component 274 which provides a user interface to the user indicating the particular function or mode change which is to be assigned to the next coded image which is captured by mouse 42 and learned. Initiation of the learn mode in specifying the function/mode change is indicated by blocks 276 and 278 in FIG. 16.

The user then scans the mouse over a selected area on surface 16 which contains the coded image to be captured. Alternatively, the user can simply set the mouse 42 on that area, if the coded images are repeated on surface 116 and are spaced closely enough together that, no matter where the user sets mouse 42, at least one of the coded images will be captured by image detector 110. This is indicated by block 280.

The images are then captured by image detector 110 and image data indicative of the image is provided by control component 124 in mouse 42. A mouse packet is transmitted to serial interface 46 and to mouse driver 60 where a mouse message carrying the image data is generated and provided to operating system 35. This is indicated by blocks 282 and 284. Operating system 35 transmits the mouse message to message hook procedures which have registered with operating system 35, such that the mouse message will eventually be provided to learn mode component 274. This is indicated by block 286.

Learn mode component 274 characterizes the image by assigning a pattern key or pattern signature key to the image which can be used by control component 124 in identifying the image, and by matching component 126 in matching the image to other images stored in image table 128. This is indicated by blocks 286 and 288. Learn mode component 274 then associates the pattern key generated with a value indicative of the function or mode change which is to be represented by the coded image. This value is associated with the image key to form an image table entry for entry in image table 128 in mouse 42. This is indicated by block 290.

The image table entry is then transmitted back to mouse 42 using any suitable protocol, such as that set out for sending preformed coded images to mouse 42 from computer 20. This is indicated by block 292. The image table entries which are sent to mouse 42 are also sent to a memory location on computer 20 such that they can later be downloaded to another mouse 42, for example, when one mouse is switched for another mouse during the operation of computer 20.

It should be noted that, while the present discussion of the learn mode has proceeded with respect to only capturing a single image to be associated with a given function, other methods could be used as well. For example, the learn mode component can instruct the user to again place the mouse over the same coded image to be learned such that two instances of the same coded image can be captured. The two instances are then averaged by learn mode component 274 in order to obtain an average value indicative of the coded message to be learned. This process is illustratively repeated a number of times in order to help reduce the affects of noise, or other anomalies, on the image capturing process.

CONCLUSION

It can thus be seen that the present invention provides a mechanism by which pattern information can be provided to a computer. The pattern information can be used by the computer for a wide variety of purposes. The computer can be configured such that operational characteristics of the computer can be changed based on the pattern information. The operational characteristics can represent substantially any change in how the computer operates. The change in operational characteristics can be referred to as a change event generated based on images, (which include partial images or patterns) read from surface 116. The change event can reflect, for example, changes in behavioral characteristics of the computer input device, operational modes of the computer to which it is attached, operational characteristics of the operating system of the computer, commands to applications, or the input of user identification information. Since the change event is generated and provided to computer 20 based on what is "read" from a template or pattern provided on surface 116 by an optical tracking device, such as a mouse, the present invention overcomes significant disadvantages associated with prior systems in which software drivers or control panel applets were required to be manipulated or invoked in order to make such changes.

Although the present invention has been described with reference to preferred embodiments, workers skilled in the art will recognize that changes may be made in form and detail without departing from the spirit and scope of the invention.

What is claimed is:

1. A computer input system for providing input information to a computer, comprising:
    a computer input device configured to provide position information based on a position of the computer input device relative to a surface, the computer input device comprising a pattern detector configured to detect a pattern on the surface and a controller coupled to the pattern detector; and
    a pattern disposed on the surface, the pattern having at least first and second predetermined pattern portions thereon, the controller generating a change event based on the pattern detector switching between detecting the first predetermined pattern portion and detecting the second predetermined pattern portion;
    wherein the controller is configured to provide relative position information indicative of relative movement of the computer input device relative to the pattern when the pattern detector is detecting the first predetermined pattern portion and absolute position information indicative of an absolute position of the computer input device with respect to the pattern when the pattern detector is detecting the second predetermined pattern portion.

2. The computer input system of claim 1 wherein the controller is configured to change the position information provided for a given distance of relative movement of the computer input device with respect to the pattern, based on whether the pattern detector is then detecting the first predetermined pattern portion or a third predetermined pattern portion.

3. The computer input system of claim 2 wherein the first predetermined pattern portion comprises a first plurality of predetermined images spaced a first distance apart and wherein the third predetermined pattern portion comprises a second plurality of predetermined patterns spaced a second distance apart.

4. The computer input system of claim 3 wherein the first plurality of predetermined images comprises a first plurality of grid lines spaced the first distance apart and wherein the second plurality of predetermined images comprises a second plurality of grid lines spaced the second distance apart.

5. The computer input system of claim 2 wherein the first predetermined pattern portion comprises a first plurality of predetermined images spaced from one another by a distance which varies across the pattern.

6. The computer input system of claim 1 wherein the second predetermined pattern portion comprises a plurality of unique predetermined images spaced from one another on the surface.

7. A computer input device providing input information to a computer, comprising:
    a position transducer configured to provide position information based on movement of the computer input device relative to a surface, the position information for use in positioning a display element on computer screen;
    a pattern detector configured to detect a predetermined image of an optical pattern on the surface; and
    a controller coupled to the pattern detector and the position transducer, the controller being configured to generate a message to the computer indicative of the position information to position the display element and indicative of an operating mode change based on the predetermined image of an optical pattern detected.

8. The computer input system of claim 7 wherein the controller provides mode change information based on the pattern detector switching between detecting a first predetermined pattern portion and a second predetermined pattern portion.

9. The computer input system of 8 wherein the first predetermined pattern portion comprises at least one predetermined image indicative of a first computer operating mode and wherein the second predetermined pattern portion comprises a second predetermined image indicative of a second computer operating mode.

10. The computer input system of claim 7 wherein the controller is configured to generate mode change information indicative of command information for issuing a command to an application running on the computer, the controller generating the command information based on the pattern detector detecting at least one of the first and second predetermined pattern portions.

11. The computer input system of claim 10 wherein the application comprises a logon application and wherein the command information is indicative of a logon command and user authentication information, the logon application controlling access provided to a user based on the logon command and the user authentication information.

12. The computer input system of claim 11 wherein the surface comprises a portion of a user identification badge.

13. The computer input system of claim 1 wherein the first and second predetermined pattern portions are learned patterns which are learned by the controller in response to initiation of a learn mode of operation.

14. The computer input system of claim 1 wherein the controller is housed within the computer.

15. A method of providing a user input to a computer, the method comprising:
  placing a user input device over a first portion of a surface having a first predetermined pattern disposed thereon;
  detecting a first image indicative of the first predetermined pattern;
  providing first pattern information to the computer indicative of detection of the first image;
  placing the user input device over a second portion of the surface having a second predetermined pattern disposed thereon;
  detecting a second image indicative of the second predetermined pattern;
  providing second pattern information to the computer indicative of detection of the second image; and
  providing position information to the computer indicative of movement of the user input device relative to the surface, the position information being used to position a display element on a computer screen.

16. The method of claim 15 and further comprising:
  controlling the computer based on the first and second pattern information.

17. The method of claim 16 wherein controlling comprises:
  changing one of an operating parameter of the user input device, and an operational mode of the computer, based on a change from detecting the first image to detecting the second image.

18. The method of claim 16 wherein the controlling step comprises:
  changing a mode of operation of the computer based on a change from detecting the first image to detecting the second image.

19. The method of claim 18 wherein the step of detecting a first image comprises:
  capturing the first image with an image detector; and
  matching information indicative of the first image to information indicative of a first stored image stored in an image store.

20. The method of claim 19 wherein the step of changing a mode of operation, comprises:
  providing a mode value associated with the first stored image, the mode value being indicative of a first mode of operation of the computer.

21. The method of claim 18 wherein the step of detecting a second image comprises:
  capturing the second image with an image detector; and
  matching information indicative of the second image to information indicative of a second stored image stored in an image store.

22. The method of claim 21 wherein the step of changing a mode of operation, comprises:
  providing a mode value associated with the second stored image, the mode value being indicative of a second mode of operation of the computer.

23. The method of claim 16 wherein the controlling step comprises:
  changing an operating parameter of the user input device.

24. The method of claim 23 wherein the user input comprises position information, and wherein the controlling step comprises:
  changing the position information from relative position information indicative of movement of the user input device relative to the surface to absolute position information indicative of an absolute position of the user input device with respect to the surface, based on whether the user input device is detecting the first image or the second image.

25. A method of controlling a computer, comprising:
  providing a computer input device moveable relative to a surface;
  detecting a predetermined image of an optical pattern on the surface with the computer input device; and
  configuring the computer to operate according to an operational mode based on the optical pattern detected on the surface, and providing position information to the computer based on movement of the computer input device relative to the surface to position a display element on a computer screen.

26. The method of claim 25 wherein the step of providing position information comprises:
  detecting a substantially random image on the surface;
  moving the user input device relative to the surface; and
  detecting a change in relative position of the substantially random image relative to the user input device.

27. A method of controlling a computer based on input information provided by a user input device, comprising;
  placing the user input device over a surface;
  generating position information based on movement of the user input device relative to the surface;
  positioning a display item on a computer screen based on the position information generated from the input device;
  detecting a predefined image of an optical pattern on the surface; and
  issuing a command to an application program running on the computer based on the predefined optical pattern detected on the surface.

28. A method of controlling a computer based on input information provided by a user input device useable for generating position information based on movement of the user input device relative to a surface and positioning a display item on a computer screen based on the position information generated from the input device, the method comprising:

detecting a predefined image of an optical pattern on a surface; and controlling a procedure to log on to the computer based on the predefined image of the optical pattern detected.

29. A computer input device for providing input information to a computer, comprising:

a position transducer configured to provide position information based on a position of the computer input device relative to a surface, the position information being used to position a display element on a computer screen;

a pattern detector configured to detect first and second predefined images of optical patterns on the surface; and a controller coupled to the pattern detector and being configured to generate pattern information for transmission to the computer to control an operating mode of the computer, the pattern information being indicative of whether the pattern detector is detecting the first predefined image of an optical pattern or the second predefined image of an optical pattern.

30. The computer input device of claim 29 wherein the controller is configured to generate a first information packet including a pattern portion containing first pattern information indicative of the pattern detector detecting the first predefined image of an optical pattern.

31. The computer input device of claim 29 wherein the controller is configured to generate a second information packet including a pattern portion containing second pattern information indicative of the pattern detector detecting the second predefined image of an optical pattern.

32. The computer input device of claim 31 wherein the controller is configured to generate the first information packet with the first pattern information being indicative of a first plurality of predetermined optical images spaced a first distance apart and wherein the controller is configured to generate the second information packet with the second pattern information being indicative of a second plurality of predetermined optical images spaced a second distance apart.

33. The computer input device of claim 31 wherein the controller is configured to generate the first information packet with the first pattern information being indicative of a first plurality of optical images spaced from one another by a distance which varies across the first optical pattern.

34. The computer input system of claim 1 wherein the surface comprises:

a first surface portion on a first side of a substrate and having the first predetermined pattern portion disposed thereon; and a second surface portion on a second side of the substrate and having the second predetermined pattern portion disposed thereon.

35. The computer input device of claim 7 wherein the operating mode change comprises changing a font size based on the predetermined image of an optical pattern then being detected.

36. A computer input device providing input information to a computer, comprising:

a position transducer configured to provide position information based on movement of the computer input device relative to a surface, the position information for use in positioning a display element on a computer screen, the position transducer including a pattern detector configured to detect substantially random image patterns on the surface and predetermined image patterns on the surface; and a controller coupled to the pattern detector, the controller being configured to generate a message to the computer indicative of the position information based on the substantially random image pattern when the pattern detector is detecting the substantially random image pattern and to switch to providing the position information based on the predetermined image pattern when the pattern detector is detecting the predetermined image pattern.

\* \* \* \* \*

UNITED STATES PATENT AND TRADEMARK OFFICE
CERTIFICATE OF CORRECTION

PATENT NO. : 6,303,924 B1
DATED : October 12, 2001
INVENTOR(S) : Adan et al.

It is certified that error appears in the above-identified patent and that said Letters Patent is hereby corrected as shown below:

Column 3,
Line 30, delete "his" and insert -- is --.

Column 5,
Line 16, delete "are" and insert -- area --.

Column 6,
Line 11, delete "if" and insert -- of --.

Column 8,
Line 23, delete "affect" and insert -- effect --.

Column 10,
Line 44, delete "16" and insert -- 116 --.
Line 54, delete "in" and insert -- is --.

Column 12,
Line 66, delete "128" and insert -- 180 --.
Line 67, delete "table" and insert -- component --.

Column 18,
Line 16, delete "message" and insert -- image --.
Line 57, delete "16" and insert -- 116 --.

Column 19,
Line 39, delete "affects" and insert -- effects --.

UNITED STATES PATENT AND TRADEMARK OFFICE
CERTIFICATE OF CORRECTION

PATENT NO.    : 6,303,924 B1
DATED         : October 12, 2001
INVENTOR(S)   : Adan et al.

It is certified that error appears in the above-identified patent and that said Letters Patent is hereby corrected as shown below:

Column 20,
Line 59, after "on" and insert -- a --.

Signed and Sealed this

Tenth Day of June, 2003

JAMES E. ROGAN
*Director of the United States Patent and Trademark Office*